US 6,597,830 B1

(12) United States Patent
Nakabayashi et al.

(10) Patent No.: US 6,597,830 B1
(45) Date of Patent: Jul. 22, 2003

(54) MATRIX OPTICAL SWITCH AND OPTICAL ADM

(75) Inventors: Yukinobu Nakabayashi, Tokyo (JP); Jun Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/720,787

(22) PCT Filed: Jun. 29, 1999

(86) PCT No.: PCT/JP99/03490

§ 371 (c)(1),
(2), (4) Date: Mar. 1, 2001

(87) PCT Pub. No.: WO00/02085

PCT Pub. Date: Jan. 13, 2000

(30) Foreign Application Priority Data

Jul. 1, 1998 (JP) .......................................... 10-185787
Apr. 15, 1999 (JP) .......................................... 11/108529

(51) Int. Cl.$^7$ ................................................ G02B 6/28
(52) U.S. Cl. ........................................................ 385/24
(58) Field of Search ................................. 359/118, 245, 359/248, 315, 320; 385/17, 24, 27

(56) References Cited

U.S. PATENT DOCUMENTS

| | | | | |
|---|---|---|---|---|
| 5,488,500 A | * | 1/1996 | Glance ....................... | 359/127 |
| 5,717,798 A | * | 2/1998 | Strasser et al. ............... | 385/37 |
| 5,724,167 A | * | 3/1998 | Sabella ...................... | 359/128 |
| 6,173,093 B1 | * | 1/2001 | Jeal ............................. | 385/24 |
| 6,208,441 B1 | * | 3/2001 | Jones et al. ................. | 359/127 |
| 6,427,037 B1 | * | 7/2002 | Okayama ..................... | 385/16 |
| 6,449,411 B1 | * | 9/2002 | Nakamura .................... | 385/40 |

FOREIGN PATENT DOCUMENTS

| | | |
|---|---|---|
| JP | 59-140790 | 8/1984 |
| JP | 63-300218 | 12/1988 |
| JP | 6-230438 | 8/1994 |
| JP | 6-337445 | 12/1994 |
| JP | 8-220571 | 8/1996 |
| JP | 10-505212 | 5/1998 |
| JP | 10-150433 | 6/1998 |
| JP | 10-154961 | 6/1998 |

OTHER PUBLICATIONS

Nakabayashi, et al., "DC–drift Free–Polarization independent Ti:LiNbO3 8×8 Optical Matrix Switch", Proceedings of 22nd European Conference on Optical Communication (ECOC '96), vol. 4, pp. 4.157–4.160, Sep. 19, 1996.

K. Hattori, "PLC Add/Drop Switch with Auto Level Control", PLC, p. 411, Sep. 7, 1998.

* cited by examiner

Primary Examiner—Lynn D. Feild
Assistant Examiner—Thanh-Tam Le
(74) Attorney, Agent, or Firm—McGinn & Gibb, PLLC

(57) ABSTRACT

There is provided an optical matrix switch which comprises a branch-selective network and has, in its center stage, a transmittance-variable optical switch (a gate) with one input and one output. Varying the transmittance of the gate can reduce crosstalk between channels, and, if necessary, can control the power of optical channels. An optical ADM is also provided. In this optical ADM, a first level controller is provided between first and second optical switches for drop and add and controls the level of transmitted light, the level of an optical signal dropped is controlled in a second level controller, and the level of an optical signal added is controlled in a third level controller. The individual members are provided in an integral form on a single substrate. This can realize a reduction in size and a reduction in weight of an optical ADM. Further, this facilitates the control of a variation in loss in each path and the control of the level of optical signals in a terminal for drop and a terminal for add.

24 Claims, 18 Drawing Sheets

213 - 213d : OPTICAL SWITCH
214a - 214d : LEVEL CONTROLLER
215a - 215d : LEVEL CONTROLLER
216a - 216d : OPTICAL SWITCH
217a - 217d : LEVEL CONTROLLER
221a - 221d : OPTICAL WAVEGUIDE
222a - 222d : OPTICAL WAVEGUIDE
223a - 223d : OPTICAL WAVEGUIDE
224a - 224d : OPTICAL WAVEGUIDE
225a - 225d : OPTICAL WAVEGUIDE

260 : OPTICAL CIRCUIT SECTION
261 : OPTICAL CIRCUIT SECTION
262 : OPTICAL CIRCUIT SECTION
263 : OPTICAL CIRCUIT SECTION
264 : OPTICAL CIRCUIT SECTION

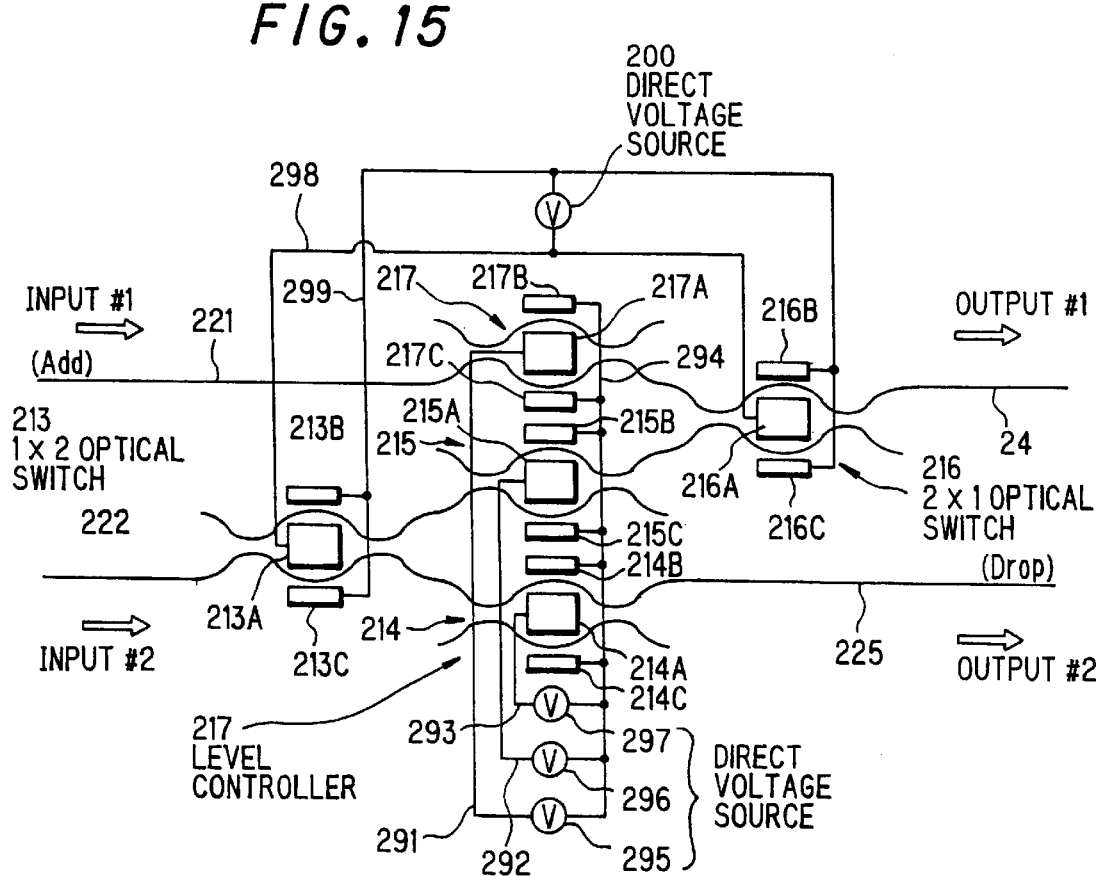

FIG. 15

213A : 1 x 2 SIGNAL ELECTRODE
213B : GROUND ELECTRODE
213C : GROUND ELECTRODE
214 : LEVEL CONTROLLER
214A : SIGNAL ELECTRODE
214B : GROUND ELECTRODE
214C : GROUND ELECTRODE
215 : LEVEL CONTROLLER
215A : SIGNAL ELECTRODE
215B : GROUND ELECTRODE
215C : GROUND ELECTRODE
216 : 2 x 1 OPTICAL SWITCH
216A : SIGNAL ELECTRODE
216B : GROUND ELECTRODE
216C : GROUND ELECTRODE

217A : SIGNAL ELECTRODE
217B : GROUND ELECTRODE
217C : GROUND ELECTRODE
221 : OPTICAL WAVEGUIDE
222 : OPTICAL WAVEGUIDE
224 : OPTICAL WAVEGUIDE
225 : OPTICAL WAVEGUIDE
291 : WIRING PATTERN
292 : WIRING PATTERN
293 : WIRING PATTERN
294 : WIRING PATTERN
298 : WIRING PATTERN
299 : WIRING PATTERN

MATRIX OPTICAL SWITCH AND OPTICAL ADM

TECHNICAL FIELD

The invention relates to a waveguide-type optical matrix switch which performs the switching and control operation of optical paths using optical waveguides provided on a substrate. The invention also relates to an optical ADM (optical add-drop multiplexer) having the function of performing optical-signal through, drop, and add.

BACKGROUND ART

In recent years, the advance of practical use of an optical communication system has led to a demand for an optical communication system having higher capacity and higher performance. In particular, in order to more stably and more efficiently operate many optical transmission lines, it has become necessary to properly recombine optical transmission paths upon occurrence of troubles of transmission paths and according to traffic. Further, also within an optical transmission apparatus, the recombination of optical paths within the apparatus upon occurrence of troubles of the optical device or the like has become necessary.

In order to cope with these demands, for example, there is a report on the use of an optical switch using a diffusion-type optical waveguide comprising an electrooptic crystal, typified by lithium niobate (LN), which has been mainly doped with titanium or the like through the surface of a substrate by thermal diffusion.

This optical switch is reported in "Daikibo Doharokata Hikari Matorikkusu Suicchi (Large Waveguide Optical Matrix Switch)" [Hideaki Okayama and Masato Kawahara, Singakugiho], TECHNICAL REPORT OF TEICE SSE 94–214, OCS 94–95 (1995–02), PP 67–72, or "Studies on a 128-Line Photonic Space-Division Switching Network Using LiNbO$_3$ Switch Matrices and Optical Amplifiers", (C. Burke, M. Fujiwara, M. Yamaguchi, H. Nishimoto, and H. Honmon, OSA Proceeding on photonic switching, 1991, Vol. 8, pp 2–6).

An optical matrix switch formed by integrating this type of optical switches is reported in "Polarization Independent-DC Drift Free Ti:LiNbO$_3$ 4×4 Matrix Optical Switch" [Y. Nakabayashi, J. Ushioda, M. Kitamura, 2nd Optoelectronics Communications Conference (OECC'97) Technical Digest, July 1997, Seoul, KOREA, 9C5-3, pp 202–203].

There is also a report on an optical matrix switch which utilizes, for example, a change in refractive index of optical waveguides by thermooptic effect using a heater mounted on a part of quartz- or polymer-based optical waveguides. This optical switch is reported in "DC-drift Free Polarization independent Ti:LiNbO$_3$8×8 Optical Matrix Switch" [Y. Nakabayashi, M. Kitamura, T. Sawano, 22nd European Conference on Optical Communication-ECOC'96, Oslo, ThD. 2.4.4, 157-4.160].

Here a single device having an optical path-switching function is called an "optical switch," and a device or optical circuit, which can realize the switching of paths of a larger number of inputs and a larger number of outputs through a combination of a plurality of optical switches, is called an "optical matrix switch." The way of combining optical switches within the optical matrix switch is called a "network."

In the optical matrix switch used in the switching of the conventional transmission path, reducing the level of crosstalk to approximately not more than −40 dB is required from the viewpoint of ensuring the transmission quality.

Also in the case where an optical matrix switch is used in the switching of path within the apparatus, minimizing the level of the crosstalk is desired. For most of the conventional optical switches reported up to now, however, meeting this requirement for low crosstalk level is difficult due to the performance of the optical switch per se.

Further, for example, in a multi-wavelength communication system using EDFA (erbium doped fiber amplifier), it is known that the optical power varies from a channel for one wavelength to a channel for another wavelength, for example, due to the dependency of the optical amplification factor of EDFA upon the wavelength and that this limits the transmission distance. Therefore, in a relay apparatus, for example, in a multi-wavelength communication system using EDFA, the function of eliminating the uneven optical power between the channels for respective wavelengths is necessary.

The optical matrix switch for the recombining light transmission paths is generally incorporated into a relay apparatus in a multi-wavelength communication system. For this reason, the optical matrix switch per se preferably has the function of, controlling the power of each optical channel from the viewpoint of reducing the size of the relay apparatus.

Accordingly, it is an object of the invention to solve the above problems of the prior art and to provide an optical matrix switch which can reduce crosstalk between channels and can, if necessary, control the power of optical channels.

FIG. 7 is a diagram showing the construction of a conventional optical ADM.

This optical ADM is provided along an optical transmission path having a plurality of channels (for example, 32 channels). An optical amplifier (AMP) 2001 is connected on the upstream side of the optical ADM, and a demultiplexer 2002 for demultiplexing a multiplexed optical signal to different wavelengths is connected to the optical amplifier 2001. 1×2 optical switches 2003 having an identical construction are connected respectively to output lines of the demultiplexer 2002. For the optical switch 2003, one of the output terminals is a drop terminal, while one of input terminals in a 2×1 optical switch 2004 is connected to the other output terminal of the optical switch 2003. The other input terminal in the 2×1 optical switch 2004 is used as an add terminal. An attenuator (ATT) 2005 is connected to the output terminal of the 2×1 optical switch 2004, and each input terminal of a multiplexer 2006 is connected to each output terminal of the attenuator 2005 in a 1:1 relationship. Further, an optical amplifier (AMP) 2007, which amplifies the multiplexed optical signal and output to the downstream side, is connected to the output terminal of the multiplexer 2006. Here optical devices, such as optical switches 2003, 2004, are connected to each other through an optical fiber. A photodetector (PD) 2008 is coupled to the optical fiber for connecting the attenuator 2005 to the multiplexer 2006. An automatic level controller (ALC) 2009 for controlling the attenuator 2005 is connected to the photodetector 2008.

The optical ADM shown in FIG. 7 is provided at a point C which is along an optical transmission line provided between points A and B distant from each other. A multiplexed optical signal from the point A is amplified in the optical amplifier to 2001, and is then demultiplexed in the demultiplexer 2002. According to the switching by the 1×2 optical switch 2003, the demultiplexed signals are dropped at the point C (that is, is withdrawn to the outside of the system) or sent to the 2×1 optical switch 2004 for transmission to the point B without drop. When the demultiplexed signals have been sent to the 2×1 optical switch 2004, they are then sent to the attenuator 2005 through the 2×1 optical switch 2004, where the control of the attenuation for output level matching is performed. The control of the attenuation in the attenuator 2005 is performed by controlling the gain or light transmission level of the attenuator 2005 through the automatic level controller 2009 based on a photoelectric conversion signal by the photodetector 2008. The optical signals from each of the attenuators 2005 are multiplexed in the multiplexer 2006, and the multiplexed light is amplified in the optical amplifier 2007 and sent toward the point B. When the 2×1 optical switch 2004 is switched to the add side, optical information from the point C is input into the 2×1 optical switch 2004 and is added to the multiplexed, optical signal from the point A. This type of ADM is described in detail, for example, in Masaki Fukui et al., "1580 mn band all-optical and node prototype equipped with fast automatic level control" (24th European Conference on Optical Communication: 9.20–24, 1988).

According to the conventional optical ADM, since an optical fiber is used to connect optical devices to each other, a reduction in size, a reduction in weight, and a reduction in cost are difficult to realize. Further, there is crosstalk of the 1×2 optical switch toward the non-output terminal. This makes it difficult to improve the extinction ratio. For example, even in the case of output to the drop terminal in the 1×2 optical switch, input is performed through the terminal for through into the 2×1 optical switch. Since, however, an attenuator is provided downstream of the 2×1 optical switch, the above crosstalk cannot be prevented. Further, since an attenuator is provided at the terminal of the 2×1 optical switch, the level control of the optical signal in the drop and add terminals is impossible. When a level controller is inserted in this site, the connection is carried out using an optical fiber. This renders the work troublesome, and leads to an increase in size. Accordingly, it is another object of the invention to provide an optical ADM which can realize a reduction in size, the suppression of crosstalk and the control of an optical signal level at the drop and add terminals without troublesome connection work and can easily realize an array construction and a multi-function.

DISCLOSURE OF THE INVENTION

According to the invention, an optical matrix switch comprises a branch-selective network in such a form that output ports of m (m=a positive integer) optical switches each with one input and n (n=a positive integer) outputs are connected to input ports of n optical switches each with m inputs and one output so that the n1st (n1=a positive integer) output port in output ports of the m1st (m1=a positive integer) optical switch with one input and n outputs is connected to the mist input port in input ports of the n1st optical switch with m inputs and one output, wherein the optical switches each with one input and n outputs and the optical switches each with m inputs and one output are formed of a material having electrooptic characteristics such that the refractive index changes upon the application of an electric field; and transmittance variable gate members are provided respectively between the output ports of the optical switches each with one input and n outputs and the input ports of the optical switches each with m inputs and one output.

That is, the optical matrix switch according to the invention comprises a branch-selective network and has, in its center stage, a transmittance-variable optical switch (a gate) with one input and one output.

At the output, the function of an optical switch having the simplest construction, that is, two inputs and two outputs (hereinafter referred to as "2×2"), will be explained. In the case of the 2×2 optical matrix switch, this network, when only the first and third stages are viewed, has the so-called "TREE" construction, and a gate is inserted into the second stage as the center stage.

By virtue of this construction, crosstalk light can be attenuated by shutting off a gate disposed on a path in unuse. Further, the control of the transmittance of the gate permits the power of optical channels to be regulated according to need.

In general, in the case of m×n optical matrix switches, m switches each with 1×n are provided in the input stage, while n switches each with m×1 are provided in the output stage. In this construction, the crosstalk light can be attenuated by providing m×n gates in the center stage and shutting off the gate disposed on a path in unuse. Further, the power of output from each channel can be regulated by controlling the transmittance of a suitable gate.

Thus, in a waveguide optical switch wherein the switching and control of optical paths are carried out using optical waveguides provided in the substrate, the crosstalk between channels can be reduced, and the power of optical channels can be regulated according to need.

Further, in order to attain the above another object, according to the invention, there is provided an optical ADM comprising: a substrate; a first optical switch which is provided on the substrate and outputs an optical signal, which has been input through a first input port, to either a first output port, (a terminal for drop) or a terminal for through; and a second optical switch which is provided on the substrate and outputs, to a second output port, either the optical signal output from the terminal for through in the first optical switch or an optical signal from a second input port (a terminal for add).

According to this construction, the first and second optical switches constituting the optical ADM and optical components connected to them are provided on a single substrate. Therefore, a reduction in size, a reduction in weight and a reduction in cost of the optical ADM can be realized. Further, increasing the number of switches according to the channels can easily realize an array construction and a multi-function on the substrate. This is suitable for the provision of multi-channel.

Further, in order to attain the above other object, according to the invention, an optical ADM comprises: a substrate; a first optical switch which is provided on the substrate and outputs an optical signal, which has been input through a first input port, to either a first output port (a terminal for drop) or a terminal for through; a second optical switch which is provided on the substrate and outputs, to a second output port, either the optical signal output from the terminal for through in the first optical switch or an optical signal from a second input port (a terminal for add); a first level controller which is provided on the substrate and controls the level of an optical signal directed from the first optical switch to the second optical switch; a second level controller which is provided on the substrate and controls the level of an optical signal output to the terminal for drop; and a third level controller which is provided on the substrate and controls the level of an optical signal input into the second-optical switch through the terminal for add.

According to this construction, a first level controller is provided between first and second optical switches for drop and add and controls the level of transmitted light, the level of an optical signal dropped is controlled in a second level controller, and the level of an optical signal added is controlled in a third level controller. The individual members are provided in an integral form on a single substrate. This can realize a reduction in size and weight of an optical ADM. Further, this enables the control of a variation in loss in each path and the control of the level of optical signals in a terminal for drop and a terminal for add without troublesome connection work. This can easily realize an array construction and a multi-function.

BRIEF DESCRIPTION OF THE DRAWINGS

FIG. 15 is a diagram showing a construction wherein an electric control system has been added to the optical circuit section shown in FIG. 13;

BEST MODE FOR CARRYING OUT THE INVENTION

Figure 1:
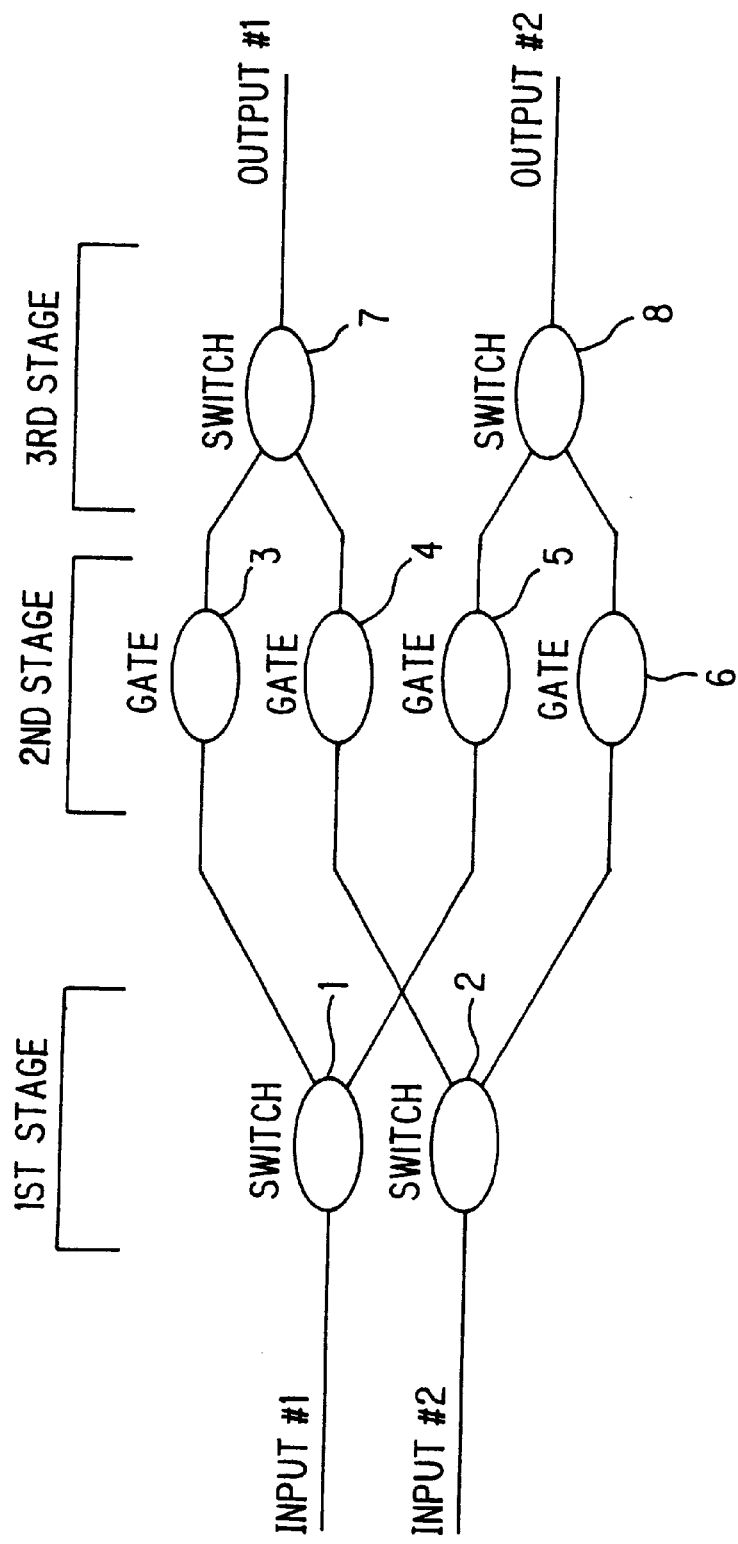
FIG. 1 is a diagram showing a preferred embodiment of a network construction of the optical matrix switch according to a preferred embodiment of the invention.

Preferred embodiments of the optical matrix switch and the optical ADM according to the invention will be explained in conjunction with the accompanying drawings. FIG. 1 is a diagram showing a preferred embodiment of a network construction of the optical matrix switch according to a preferred embodiment of the invention. More specifically, FIG. 1 is a network diagram illustrating the principle of operation according to a preferred embodiment of the invention in the case of a 2×2 optical matrix switch.

This network, when only the first and third stages are viewed, has the so-called "TREE" construction, and, in a preferred embodiment of the invention, gates are inserted into the second stage as the center stage. Specifically, transmittance-variable optical switches (gates) 3 to 6 are inserted into between switches 1, 2 connected to inputs #1, #2 and switches 7, 8 connected to outputs #1, #2.

At the outset, when connection of an input #1 to an output #1 through 2×2 matrix switches with connection of an input #2 to an output #2 through 2×2 matrix switches is contemplated, the switches are regulated so that a light introduced through the input #1 is led to switch 1→gate 3→switch 7→output #1. Therefore, the gate 3 is brought to a state such that light can be passed therethrough.

In this case, crosstalk light generated from the switch 1 is led to the gate 3. Therefore, when the gate 3 is shut off, the crosstalk light generated from the switch 1 is attenuated by the extinction ratio of the gate 3.

In order to lead light from the input #2 to the output #2, a switch 8 is set so that connection of a gate 6 to the output #2 through the switch 8 is established. Therefore, the attenuated crosstalk light led from the gate 5 is further attenuated by the switch 8.

Thus, the crosstalk level in the optical matrix switch using this network is reduced to −60 dB when the extinction ratio of the optical switches and the gates is, for example, 20 dB. The regulation of the transmittance of the gate 1 and the gate 4 in this state can regulate the power of light output from the output 1 and the output 2.

Figure 2:
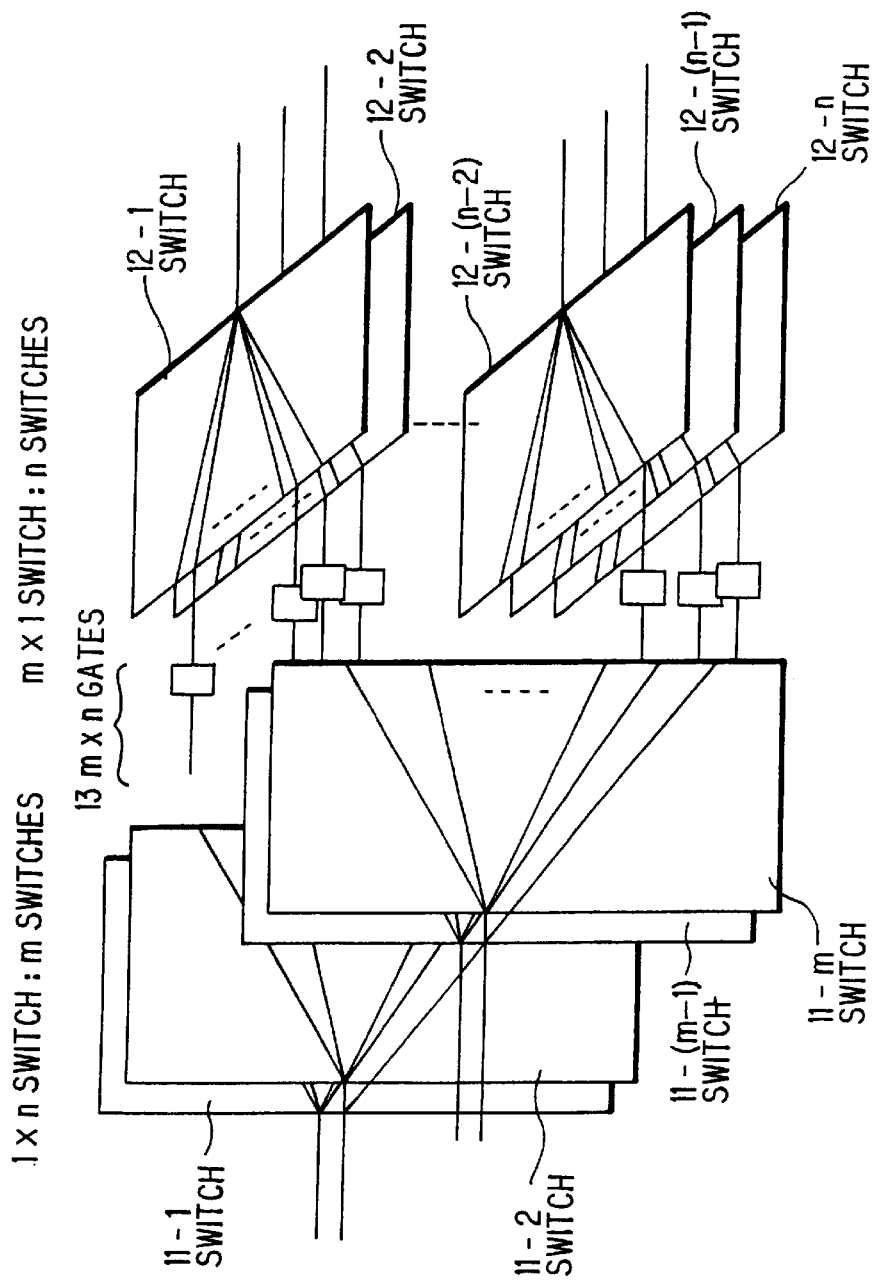
FIG. 2 is a diagram showing another preferred embodiment of a network construction of the optical matrix switch according to a preferred embodiment of the invention.

FIG. 2 is a diagram showing another preferred embodiment of a network construction of the optical matrix switch according to a preferred embodiment of the invention. More specifically, FIG. 2 is a network diagram illustrating the principle of operation according to a preferred embodiment of the invention in the case of an m=n optical matrix switch wherein m and n are each a positive integer.

m switches 11-1 to 11-m each with 1×n are provided in the input stage, and n switches 12-1 to 12-n each with m×1 are provided in the output stage. The provision of m×n gates 13 in the center stage can realize a construction of an optical matrix switch having low crosstalk. Further, the power of output from each channel can be controlled by regulating the transmittance of a suitable gate.

Figure 3:
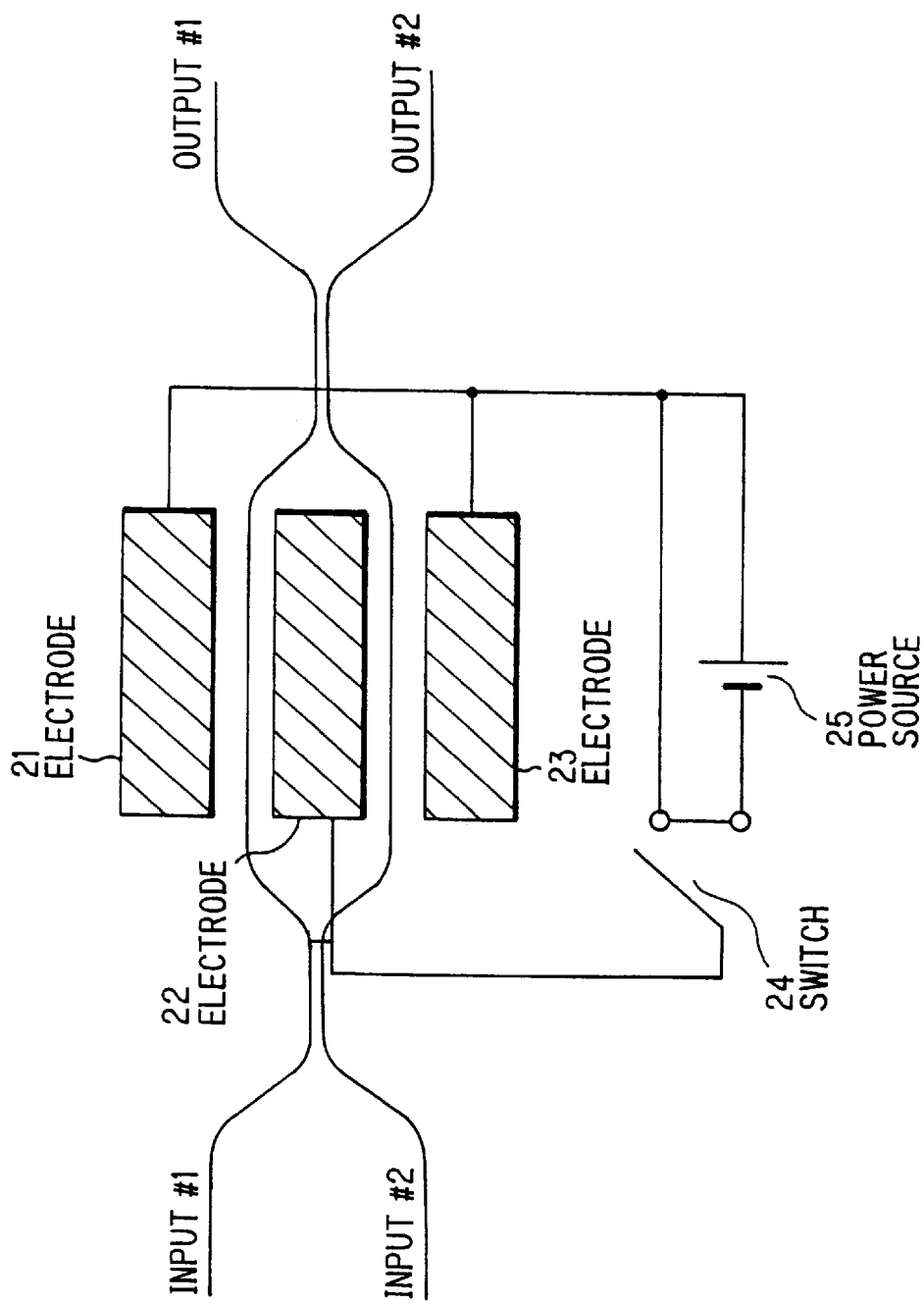
FIG. 3 is a diagram showing the construction of optical waveguides and electrodes in a Mach-Zehnder optical switch provided on a lithium niobate substrate used in a preferred embodiment of the invention.

FIG. 3 is a diagram showing the construction of optical waveguides and electrodes in a Mach-Zehnder (MZ) optical switch provided on an LN (lithium niobate) substrate used in a preferred embodiment of the invention. In the drawing, the optical switch according to a preferred embodiment of the invention is constructed so that an X cut LN crystal is used and the propagation direction of the waveguide is rendered consistent with the Z axis. Thus, the optical switch shown in the drawing is a polarized light-non-dependent switch wherein the operation voltage and the like are not changed by the input polarized light.

The waveguide is prepared by a conventional method wherein Ti is diffused on an LN substrate. This polarized light-non-dependent switch has electrodes 21 to 23, a switch 24, and a power source 25.

Figure 4:
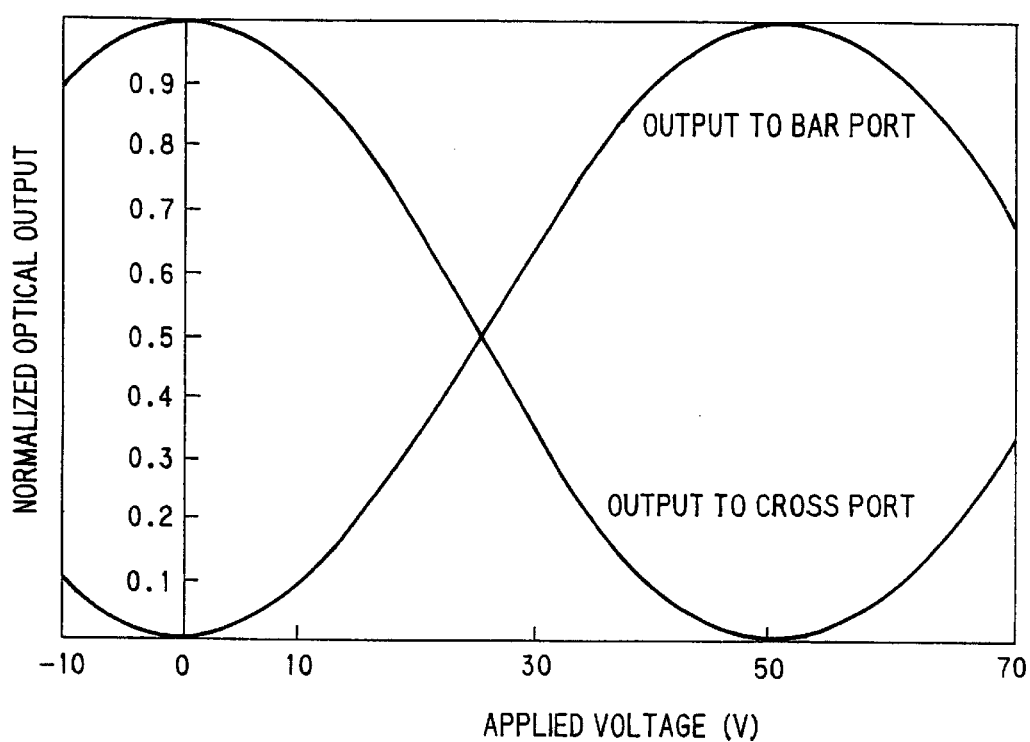
FIG. 4 is a diagram showing operation characteristics obtained by a Mach-Zehnder optical switch provided on a lithium niobate substrate used in a preferred embodiment of the invention.

FIG. 4 is a diagram showing operation characteristics obtained by a Mach-Zehnder (MZ) optical switch provided on an LN substrate used in a preferred embodiment of the invention. More specifically, FIG. 4 shows operation characteristics commonly obtained for an optical switch having a construction such that, in a completed MZ optical interference system, one signal electrode is provided and ground electrodes are provided so as to surround the signal electrode.

When the length of the electrodes 21 to 23 is about 6 mm, typically, at an operation voltage of about 50 V, the cross state caused by leading light from the input #1 to the output #2 and leading light from the input #2 to the output #1 is shifted to the opposite bar state.

Figure 5:
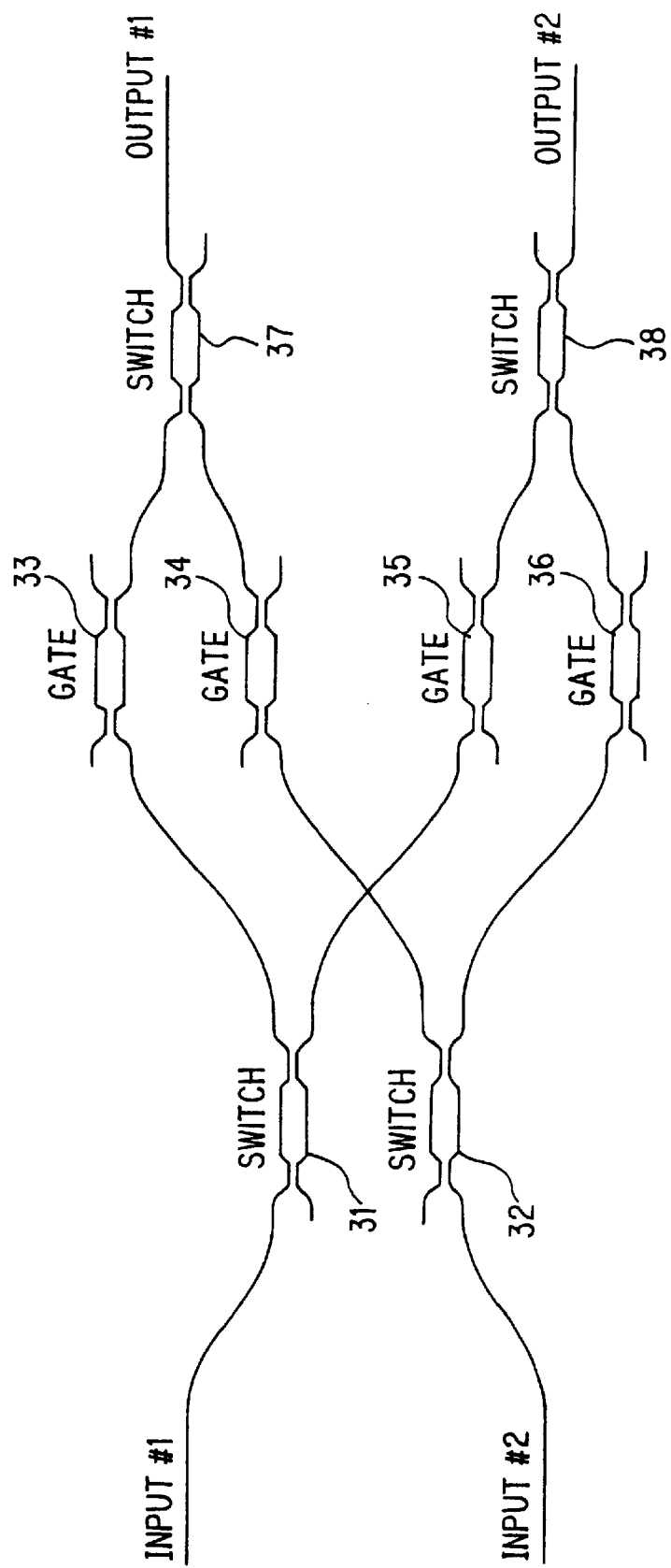
FIG. 5 is a diagram showing a waveguide layout of a 2×2 optical matrix switch constructed of the Mach-Zehnder optical switch shown in FIG. 1.

FIG. 5 is a diagram showing a waveguide layout of a 2×2 optical matrix switch constructed of the MZ optical switch shown in FIG. 1. In the drawing, an MZ optical switch is used also in gates 33 to 36 provided between switches 31, 32 connected respectively to inputs #1, #2 and switches 37, 38 connected respectively to outputs #1, #2, that is, provided in the center stage.

When the voltage applied to all the switches 31, 32, 37, 38 and gates 33 to 36 were brought to zero V, the operation characteristics of the switches 31, 32, 37, 38 followed those shown in FIG. 4, and, as the 2×2 matrix switch, a cross state from the input #1 to the output #2 and from the input #2 to the output #1 could be obtained. The crosstalk level at that time was typically −60 dB. In this state, the regulation of the voltage applied to the gate 35 has enabled the power of output to the output #2 to be regulated according to output characteristic curve to the cross port in the operation characteristics shown in FIG. 4.

Further, when 50 V was applied to all the switches 31, 32, 37, 38 and gates 33 to 36, a state such that, as the 2×2 matrix switch, light is led from the input #1 to the output #1, that is, a bar state, could be attained.

At that time, the crosstalk level was typically −60 dB. In this state, the regulation of the voltage applied to the gate 33 and the gate 35 enabled the regulation of the power output to the outputs #1 and #2.

Figure 6:
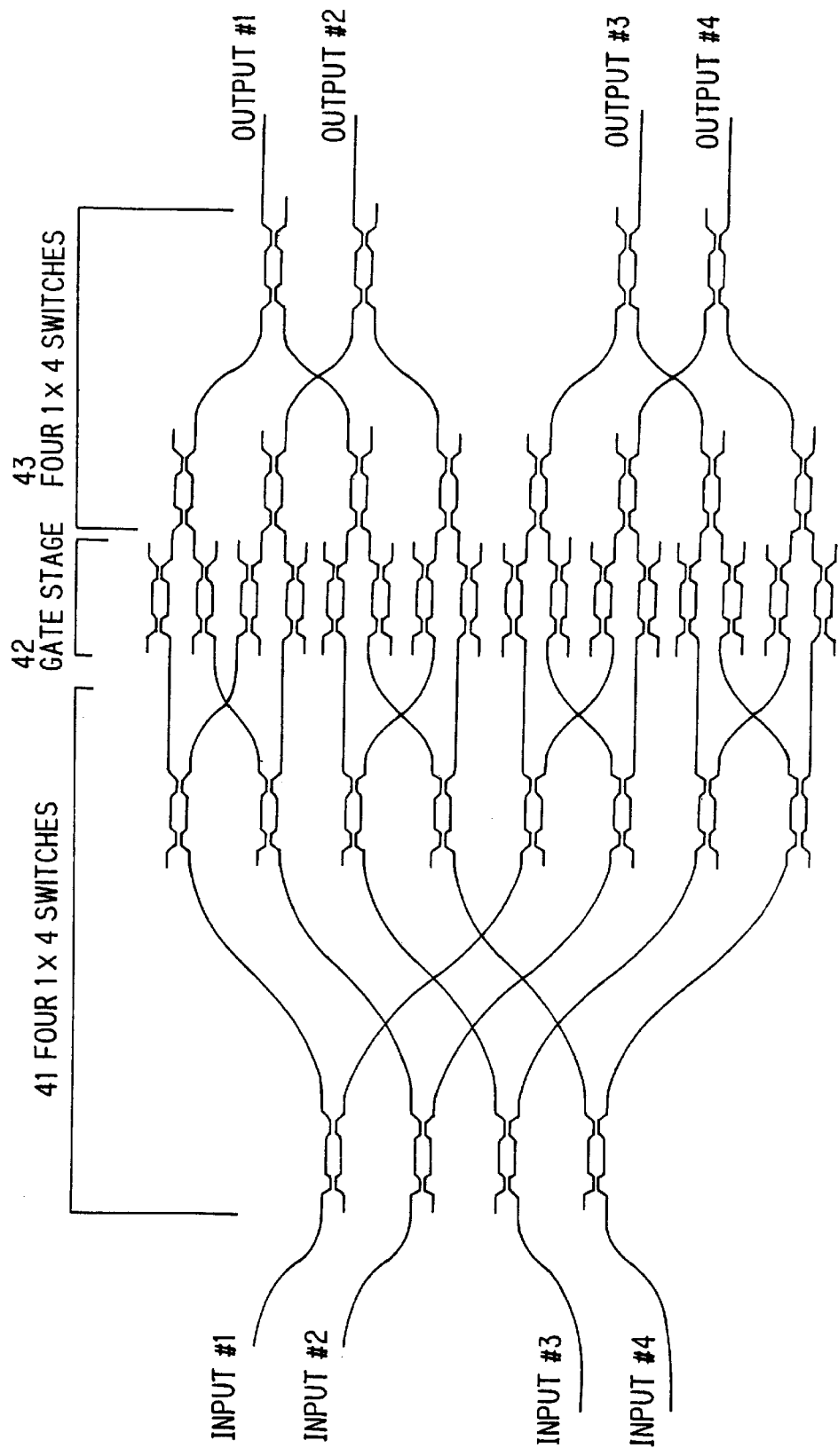
FIG. 6 is a diagram showing a waveguide layout of a 4×4 optical matrix switch constructed of the Mach-Zehnder optical switch shown in FIG. 1.
Figure 7:
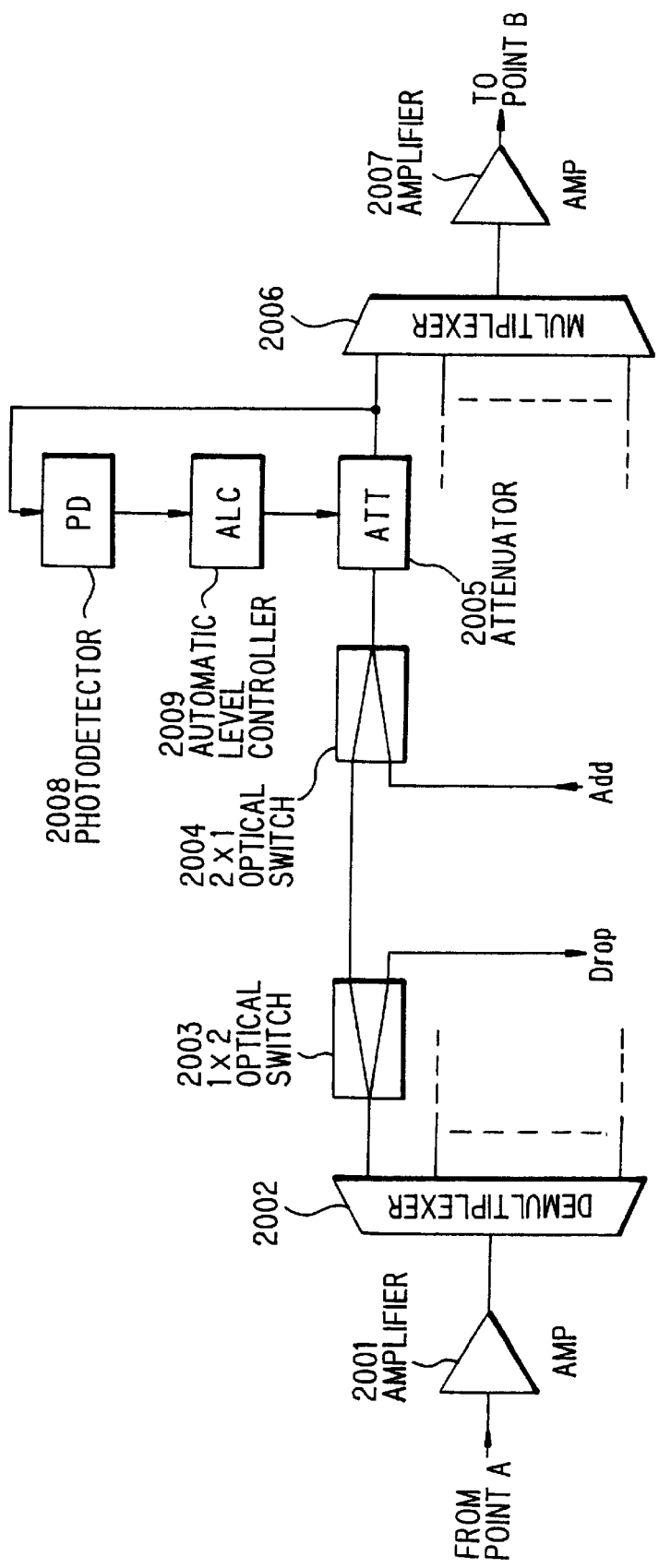
FIG. 7 is a diagram showing the construction of a conventional optical ADM.

FIG. 6 is a diagram showing a waveguide layout of a 4×4 optical matrix switch constructed of an MZ optical switch shown in FIG. 1. In the drawing, an MZ optical switch is used also in a gate stage 42 provided between four 1×4 switches 41 connected to the inputs #1 to #4 and four 4×1 switches 43 connected to the outputs #1 to #4, that is, is also provided in the center stage.

Setting of the relationship, between the inputs #1 to #4 and the output ports to which the inputs #1 to #4 are connected, is approximately as in the case of the 2×2 matrix switch shown in FIG. 5. The crosstalk level at that time was typically −60 dB. In the state setting, the regulation of the voltage applied to gates in a suitable gate stage enabled the loss caused by the insertion of the present matrix switch to be controlled as desired in the range of 7 dB to 25 dB.

In a preferred embodiment of the invention, the use of an MZ optical switch on an X cut LN crystal substrate in the optical switch and the gate has been described in detail. As is apparent from the above description, the optical path switch circuit according to a preferred embodiment of the invention does not depend upon the type of the optical device used in the optical switch and the gate.

For example, a semiconductor optical amplification gate may be used in the center gate stage. As well known in the art, the semiconductor optical amplification gate is a device which absorbs light in the case of no current feed and, upon a suitable current feed, exhibits a photoamplification function. Therefore, when a semiconductor optical amplification gate is used in the gate switch according to a preferred embodiment of the invention, the loss caused by the insertion of the 1×N switch mounted on the former stage and the latter stage can be compensated for. This can realize the construction of a lower-loss matrix.

Further, a directional coupler-type optical switch having the function of selecting a waveguide, which can actually provide an optical output, from a plurality of output optical waveguides by varying the refractive index of directional couplers provided in optical waveguides, for example, made of an electrooptic crystal, through a change in electric field can be also applied to the 1×N switch and the gate.

Furthermore, a digital optical switch having the function of selecting a waveguide, which can actually provide an optical output, from a plurality of output optical waveguides by varying the refractive index of a plurality of output optical waveguides connected in a Y-branched form to a single input optical waveguide provided in an optical waveguide, for example, made of an electrooptic crystal, through a change in electric field can be applied to the 1×N switch and the gate. As described above, the method wherein the transmittance is varied by the electrooptic effect, is advantageous in that, as compared with the method using the thermooptic effect, the power consumption can be reduced and the operation speed can be increased.

Thus, the provision of transmittance-variable optical switches (gates) with one input and one output in the center stage of a matrix constructed of a network having a TREE structure permits a low crosstalk level required of optical communication to be easily achieved. Further, in this case, the intensity level of light output from each output port can be controlled. These advantages render this construction very valuable from the viewpoint of industry.

As is, apparent from the foregoing description, the optical matrix switch according to the invention comprises a branch-selective network in such a form that output ports of m (m=a positive integer) optical switches each with one input and n (n=a positive integer) outputs are connected to input ports of n optical switches each with m inputs and one output so that the n1st (n1=a positive integer) output port in output ports of the m1st (m1=a positive integer) optical switch with one input and n outputs is connected to the m1st input port of the n1st optical switch with m inputs and one output. In this optical switch, either transmittance-variable optical attenuators or variable optical amplifiers each with one input and one output are provided between the output ports of the optical switches each with one input and n outputs and the input ports of the optical switches each with m inputs and one output. This can advantageously reduce crosstalk between channels, and can regulate the power of optical channels according to need.

Next, preferred embodiments of the optical ADM according to the invention will be explained in conjunction with the accompanying drawings.

Figure 8:
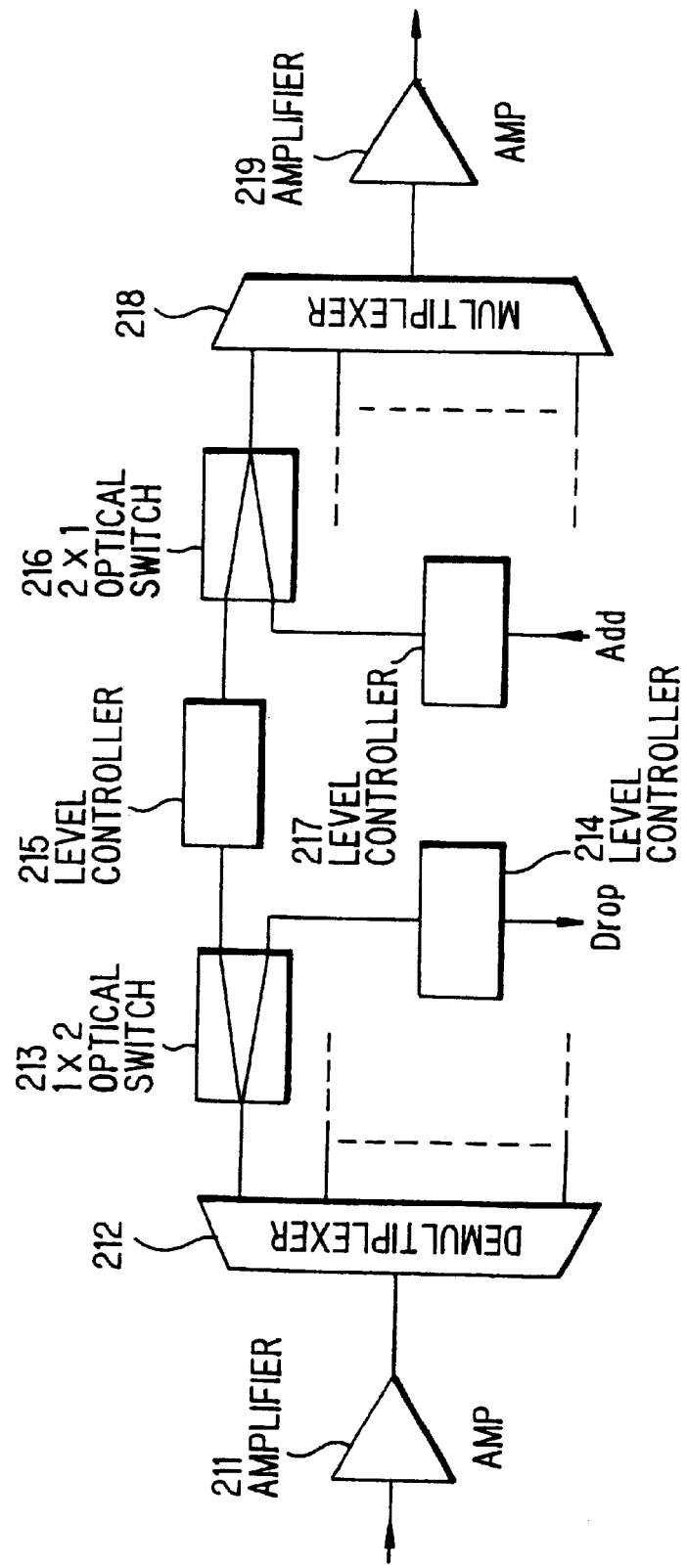
FIG. 8 is a diagram showing the construction of a first preferred embodiment of the optical ADM according to the invention.

FIG. 8 shows a first preferred embodiment of the optical ADM according to the invention.

The optical ADM according to the invention is provided along an optical transmission path having a plurality of channels (for example, 32 channels). An optical amplifier (AMP) 211 is connected on the upstream side of the optical ADM. A demultiplexer 212 for demultiplexing a multiplexed optical signal to different wavelengths is connected to the optical amplifier 211. 1×2 optical switches 213 having an identical construction; are connected respectively to output lines of the demultiplexer 212. A level controller 214 is connected to one of the output terminals in the 1×2 optical switch 213, and the input terminal functions as a drop terminal. A level controller 215 is connected to the other output terminal of the 1×2 optical switches 213. One input terminal in a 2×1 optical switch 216 is connected to this level controller 215. A level controller 217 is connected to the other input terminal in the 2×1 optical switch 216, and this input terminal functions as an add terminal. Each input terminal of a multiplexer 218 is connected in a 1:1 relationship to each output terminal of the 2×1 optical switches 216. An optical amplifier (AMP) 219 is connected to the output terminal of the multiplexer 218. The amplified output from the optical amplifier 219 is sent downward.

The optical amplifiers 211, 219, the demultiplexer 212, the 1×2 optical switch 213, the level controllers 214, 215, 217, the 2×1 optical switch 216, and the multiplexer 218 are provided on a single substrate (for example, an X cut LN crystal substrate). The connection between the optical switches and the level controllers 214, 215, 217, the connection between the 1×2 optical switch 213 and the demultiplexer 212, and the connection between the 2×1 optical switch 216 and the multiplexer 218 are performed through an optical waveguide.

An MZ (Mach Zehnder) optical switch, a variable optical amplifier (a semiconductor optical amplification gate) or the like may be used in the 1×2 optical switch 213, the 2×1 optical switch 216, and the level controllers 214, 215, 217. The MZ optical switch provided on an X cut LN (lithium niobate) crystal substrate features a switch function and a level control function by drive at low power. Further, as well known in the art, the semiconductor optical amplification gate is a device which absorbs an optical signal in the case of no current feed and, upon suitable current feed, exhibits optical amplification. Therefore, when the semiconductor optical amplification gate is used in the optical switches 213, 216 and the level controllers 214, 215, 217, the loss caused by the insertion of the 1×N (or N×1) switch provided before or behind them can be compensated for. This can realize a construction of a lower-loss optical ADM.

Further, a digital optical switch (an optical switch or gate having the function of selecting a waveguide, which can actually provide an optical output, from a plurality of output optical waveguides by varying the refractive index of a plurality of output optical waveguides connected in a Y-branched form to a single input optical waveguide provided in an optical waveguide, for example, made of an electrooptic crystal or a material having thermooptic effect, through a change in electric field) may also be used in the optical switches 213, 216 and the level controllers 214, 215, 217. As compared with the use of the thermooptic effect, the use of the electrooptic crystal in the optical switch or the level controller can advantageously reduces the power consumption and increase the operation speed.

Alternatively, a directional coupler-type optical switch having the function of selecting a waveguide, which can actually provide an optical output, from a plurality of output optical waveguides by varying the refractive index of directional couplers provided in optical waveguides, for example, made of an electrooptic crystal, through a change in electric field may be used in the optical switches 213, 216 and the level controllers 214, 215, 217. When an optical waveguide formed of a material having thermooptic effect typified by quartz is used, a heater may be mounted at a suitable position of the optical waveguide to regulate the change in refractive index by a current applied to the heater, thereby permitting the optical path to be switched.

In the construction shown in FIG. 8, the optical ADM is provided at a point C along the optical transmission line provided between points A and B. A multiplexed optical signal from the point A is amplified in the optical amplifier 211, and then demultiplexed in the demultiplexer 212. When the 1×2 optical switch 213 is in the state of being switched to the level controller 214 side, the demultiplexed signals are subjected to predetermined attenuation in the level controller 214 and are then withdrawn to the outside of the system (Drop). When the 1×2 optical switch 213 is in the state of being switched to the level controller 215 side, the optical signals are subjected to predetermined attenuation (or amplification) for output level matching in the level controller 215, and then input through the 2×1 optical switch 216 into the multiplexer 218, where other optical signals are added thereto.

When the 2×1 optical switch 216 is in the state of being switched to the level controller 217, instead of the optical signals from the level controller 215, optical signals introduced from the point C may be sent through the 2×1 optical switch 216 to the multiplexer 218 (Add). At that time, the optical signals introduced at the point C are subjected to predetermined attenuation (or amplification) for output level matching in the level controller 217. The optical signals from the 2×1 optical switches 216 are added to other optical signals in the multiplexer 218, and the multiplexed optical signal is amplified in the optical amplifier 219, and then sent toward the point B.

Figure 9:
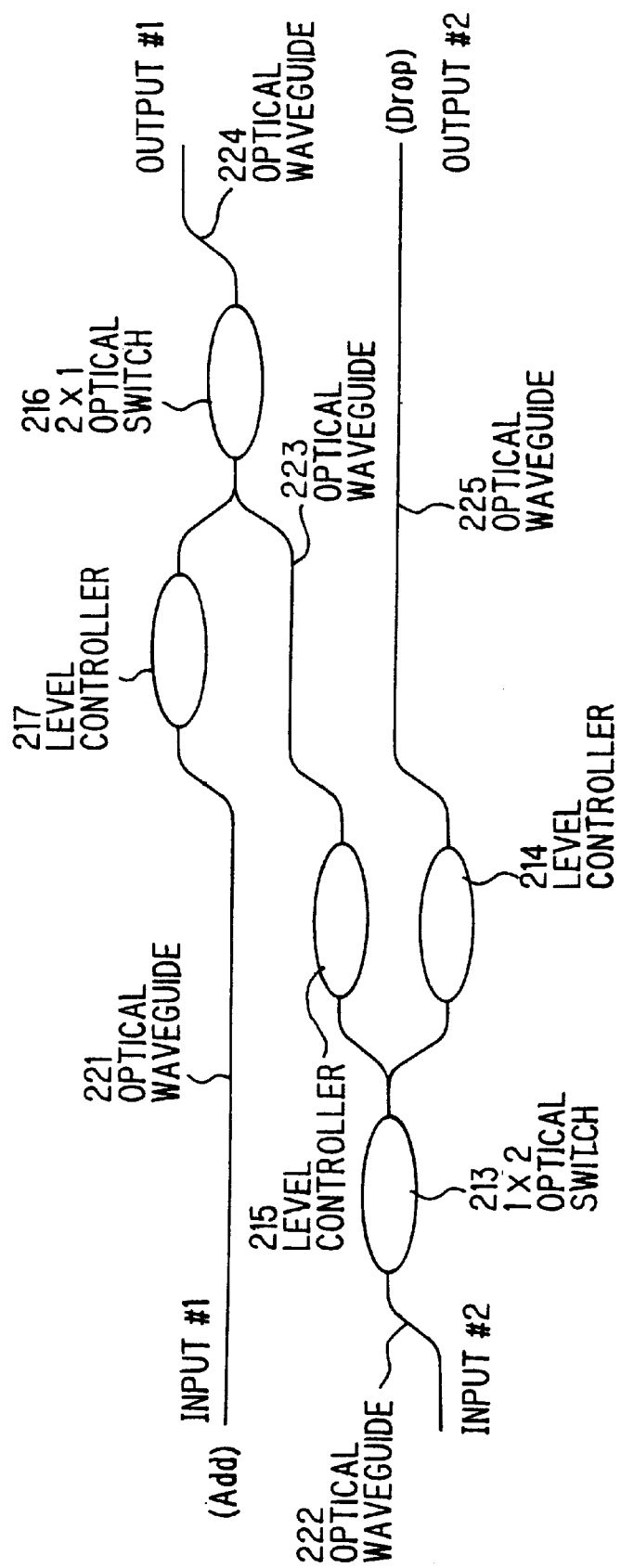
FIG. 9 is a connection diagram wherein an optical circuit section corresponding to one channel in the optical ADM shown in FIG. 8 is rewritten so that an optical signal is directed from the input toward the output.

FIG. 9 is a connection diagram wherein an optical circuit section corresponding to one channel in the optical ADM shown in FIG. 8 is rewritten so that an optical signal is directed from the input toward the output. Here a construction is shown wherein the demultiplexer 212 and the multiplexer 218 have been removed from the construction shown in FIG. 8. An MZ optical switch, which functions as a gate, is used in the level controllers 214, 215, 217. The input #1 corresponds to an Add terminal, the input #2 the output of the demultiplexer 212, the output #1 the output of the 2×1 optical switch 216, and the output #2 a Drop terminal.

As shown in FIG. 9, optical waveguides 221, 222 are connected respectively to the inputs #1 and #2. A level controller 217 is provided within the optical waveguide 221, and a 1×2 optical switch 213 is provided within the optical waveguide 222. Optical waveguides 223, 225 are connected respectively to two output terminals of the 1×2 optical switch 213. A level controller 215 is provided within the optical waveguide 223, and a level controller 214 is provided within the optical waveguide 225. Further, a 2×1 optical switch 216 is provided between the optical waveguide 223 and the level controller 217 and the output #1.

Figure 10:
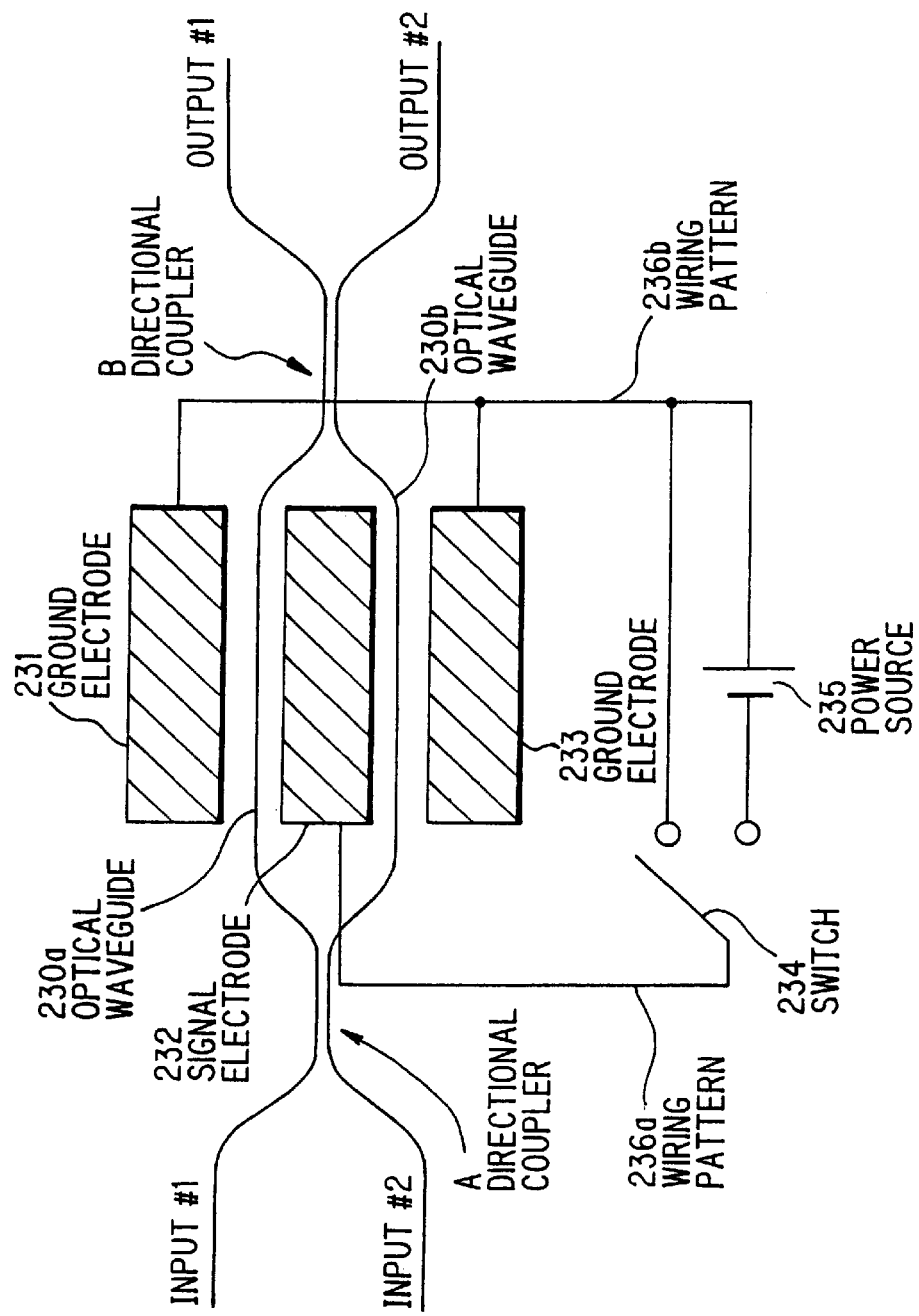
FIG. 10 is a connection diagram showing an MZ optical switch used in an optical switch and a level controller according to the invention.

FIG. 10 shows the construction of an MZ optical switch used in the 1×2 optical switch 213, the 2×1 optical switch 216, and the level controller 214, 215, 217. The MZ optical switch comprises an optical waveguide and an electrode provided on an LN substrate. That is, an optical waveguide is provided by Ti diffusion on a substrate using an X cut LN crystal. When the propagation direction of the optical waveguide is rendered consistent with the Z axis, a polarized light-non-dependent switch can be constructed wherein the operation voltage and the like are not changed by the input polarized light.

As shown in FIG. 10, two directional couplers A, B are formed by two optical waveguides 230a, 230b. A signal electrode 232 is provided in the center of the optical waveguide between the directional couplers A, B, and ground electrodes (earth electrodes) 231, 233 are provided on both sides of the signal electrode 232 so as to sandwich the optical waveguides. Wiring patterns 236a, 236b are connected to the signal electrode 232 and the ground electrodes 231, 233, wherein the wiring pattern 236b is connected to the signal electrode 232. The wiring patterns 236a and 236b are connected to the switch 234, and a power source 235 is connected in parallel to the switch 234.

Figure 11A:
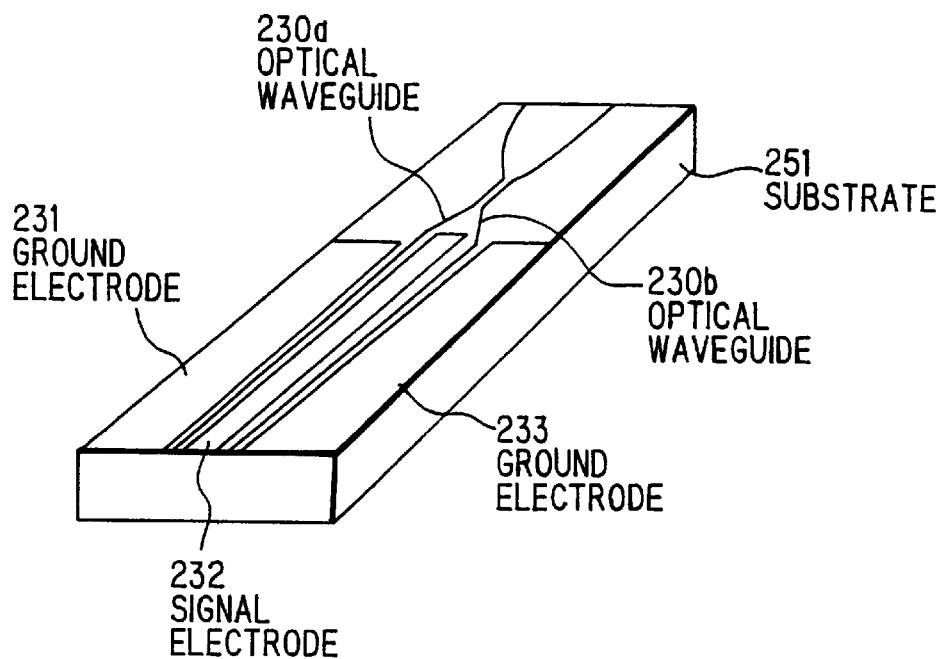
FIGS. 11A and 11B are perspective views showing examples of MZ optical switches which are different from each other in disposition of electrodes.
Figure 11B:
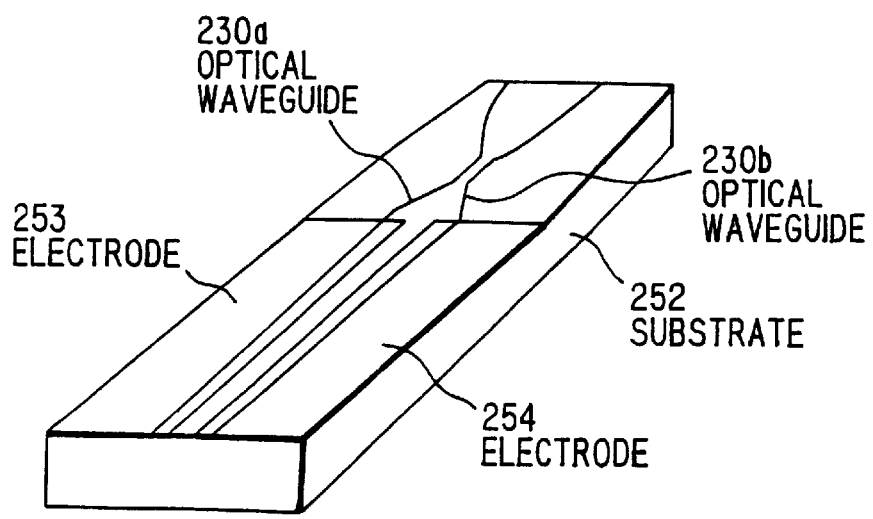

FIG. 4 shows the operation characteristics of the MZ optical switch shown in FIG. 10. When the length of each of the electrodes 231 to 233 is about 6 mm, at an operation voltage (DC) of about 50 V, the cross state caused by leading light from the input #1 (Add) to the output #2 (Drop) and leading light from the input #2 (output of demultiplexer 12) to the output #1 is shifted to the bar state. FIGS. 11A and 11B show examples of MZ optical switches which are different from each other in disposition of electrodes. FIG. 11A is a perspective view of an MZ optical switch having three electrodes shown in FIG. 10, and FIG. 11B is a perspective view of an MZ optical switch having two electrodes. In FIG. 11A, a directional coupler is formed by rendering a part of two optical waveguides 230a, 230b close to each other on an LN substrate 251. A belt-shaped signal electrode 232 is provided adjacent to the directional coupler and between the optical waveguides 230a, 230b, and belt-shaped ground electrodes 231, 233 are provided on the outside of the optical waveguides 230a, 230b. In this construction, a voltage is laterally applied to the optical waveguides 230a, 230b. In the construction shown in FIG. 11B, as with FIG. 11A, two optical waveguides 230a, 230b are formed on the substrate 252, and electrodes 253, 254 are provided on the outside of the optical waveguides 230a, 230b so that a part of the electrodes are overlapped with the optical waveguides 230a, 230b. In this case, a voltage is applied between the electrodes 253, 254 and ground electrodes (not shown). In this construction, a voltage is vertically applied to the optical waveguides 230a, 230b to perform phase shift.

In FIGS. 8 and 9, the 1×2 optical switch 213 has the function of performing a selection such that an optical signal introduced through an input #2 is output to an output #1 or an output #2. The level controller 215 performs a selection such that any optical signal introduced through the input #1 or the input #2 is output through the output #1. In the level controller 214, the transmittance of an optical signal, which is introduced through the input #2 and is output from the output #2, is regulated. In the level controller 215, the transmittance of an optical signal, which is introduced through the input #2 and is output from the output #2, that is, the attenuation, is regulated. Further, in the level controller 217, the transmittance of an optical signal, which is introduced through the input #1 and is output from the output #1, is regulated.

Next, the switching operation and the formation of the path in the optical switch having a construction shown in FIG. 9 will be explained. The optical signal input through the input #1 is led through the level controller 217 and the 2×1 optical switch 216 to the output #1, while the optical signal input through the input #2 is led through the 1×2 optical switch 213 to the output #1 or the output #2. For the optical signal input through the input #2, the 1×2 optical switch 213 performs a selection such that this optical signal is output either the output #1 or the output #2. For the optical signal input through the input #1 or the input #2, the 2×1 optical switch 216 performs a selection such that one of the optical signals is output from the output #1.

In the optical ADM, the optical signal, which has been input through the input #2, is generally led through the 1×2 optical switch 213, the level controller 215, and the 2×1 optical switch 216 to the output #1. When an optical signal is also input through the input #1, however, the optical signal leaked through the level controller 217 and the 2×1 optical switch 216 is led to the output #1. At the same time, the optical signal input through the input #2 is led through the 1×2 optical switch 213 and the level controller 214 to the output #2. In this situation, the extinction ratio of the optical waveguide on the LN substrate shown in FIG. 10 was 20 dB. That is, when the optical signal input through the input #1 was led to the output #1, the insertion loss can be regulated in a width of 20 dB by the level controller 215.

Likewise, when the optical signal input through the input #1 was led to the output #1, the insertion loss could be regulated in a width of 20 dB by the level controller 217. When the optical signal input through the input #2 was led to the output #2, the insertion loss could be regulated in a width of 20 dB by the level controller 214. Further, when the optical signal input through the input #2 was led through the 1×2 optical switch 213 and the level controller 214 to the output #2, the optical signal is leaked to the output #1 through the level controller 215. This leaked optical signal, however, could be brought to not more than −60 dB by regulating the 1×2 optical switch 213, the level controller 215, and the 2×1 optical switch 216.

As described above, according to the construction shown in FIG. 9, a small, low-cost optical ADM having a simple construction can be provided, and a variation in loss of the paths can be controlled. Further, waveguide-type optical circuit components are used wherein electrooptic characteristics are such that the refractive index is varied upon the application of electric field. This can easily realize an arrayed or composite construction. In FIG. 9, when an MZ optical switch shown in FIG. 10 or FIGS. 11A and 11B is used in the level controllers 214, 215, 217, this can be operated as a variable attenuator. Varying the applied voltage so as to provide a desired attenuation suffices for the operation as the variable attenuator. Thus, the variation in loss of the paths can be simply regulated.

Figure 12:
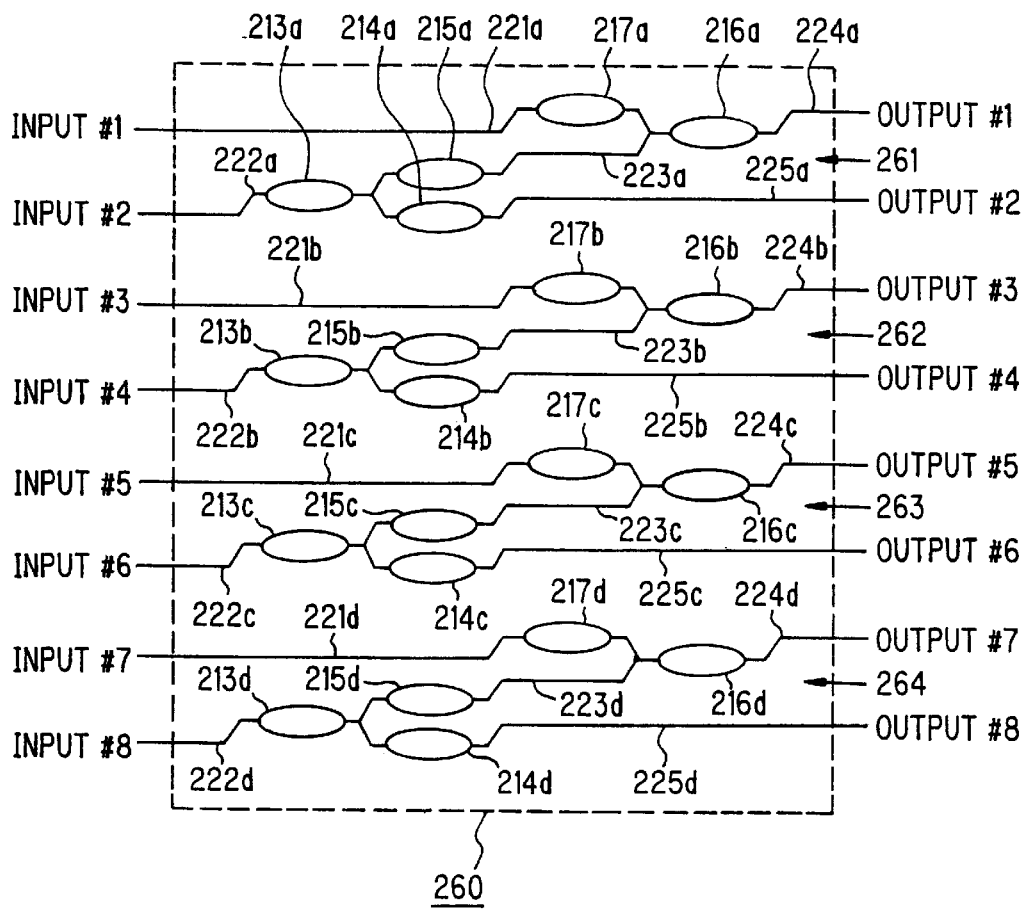
FIG. 12 is a connection diagram showing a construction wherein the optical circuit section corresponding to one channel shown in FIG. 9 has been brought to n channels.

FIG. 12 shows a construction wherein the optical circuit section corresponding to one channel shown in FIG. 9 has been brought to n channels. An optical circuit section 260 shown in FIG. 12 is characterized in that a plurality of sets of optical circuit sections shown in FIG. 9 are arrayed to constitute optical circuit sections 261, 262, 263, 264 (having an identical construction) of 8 channels in total. Here again, the demultiplexer 212 and the multiplexer 218 are not shown.

Regarding the optical circuit section 251, the optical waveguides 221a, 222a, 223a, 224a, 225a correspond to the optical waveguides 221 to 225 shown in FIG. 9, the level controllers 214a, 215a, 217a the level controllers 214, 215, 217 shown in FIG. 9, and the optical switches 213a, 216a the 1×2 optical switch 213 and the 2×1 optical switch 216 shown in FIG. 9. Likewise, the optical waveguides 221b, 222b, 223b, 224b, 225b, 221c, 222c, 223c, 224c, 225c, 221d, 222d, 223d, 224d, 225d of the optical circuit sections 262 to 264 correspond to the optical waveguides 221 to 225 shown in FIG. 9, the level controllers 214b, 215b, 217b, 214c, 215c, 217c, 214d, 215d, 217d the level controllers 214, 215, 217 shown in FIG. 9, and the optical switches 213b, 216b, 213c, 216c, 213d, 216d the 1×2 optical switch 213 and the 2×1 optical switch 216 shown in FIG. 9.

The optical circuit sections 261 to 264 are provided independently of one another, and these optical circuit sections individually perform the operation of the switch with two inputs and two outputs and the level control operation (gate operation) explained above in connection with FIG. 9. Thus, the additional provision of optical circuits with two inputs and two outputs according to need can constitute an optical ADM with desired inputs×outputs. Therefore, a small, low-cost optical ADM having a simple construction can be realized. Further, even when the number of inputs and outputs are increased to any extent, the variation in loss of the paths can be controlled.

Figure 13:
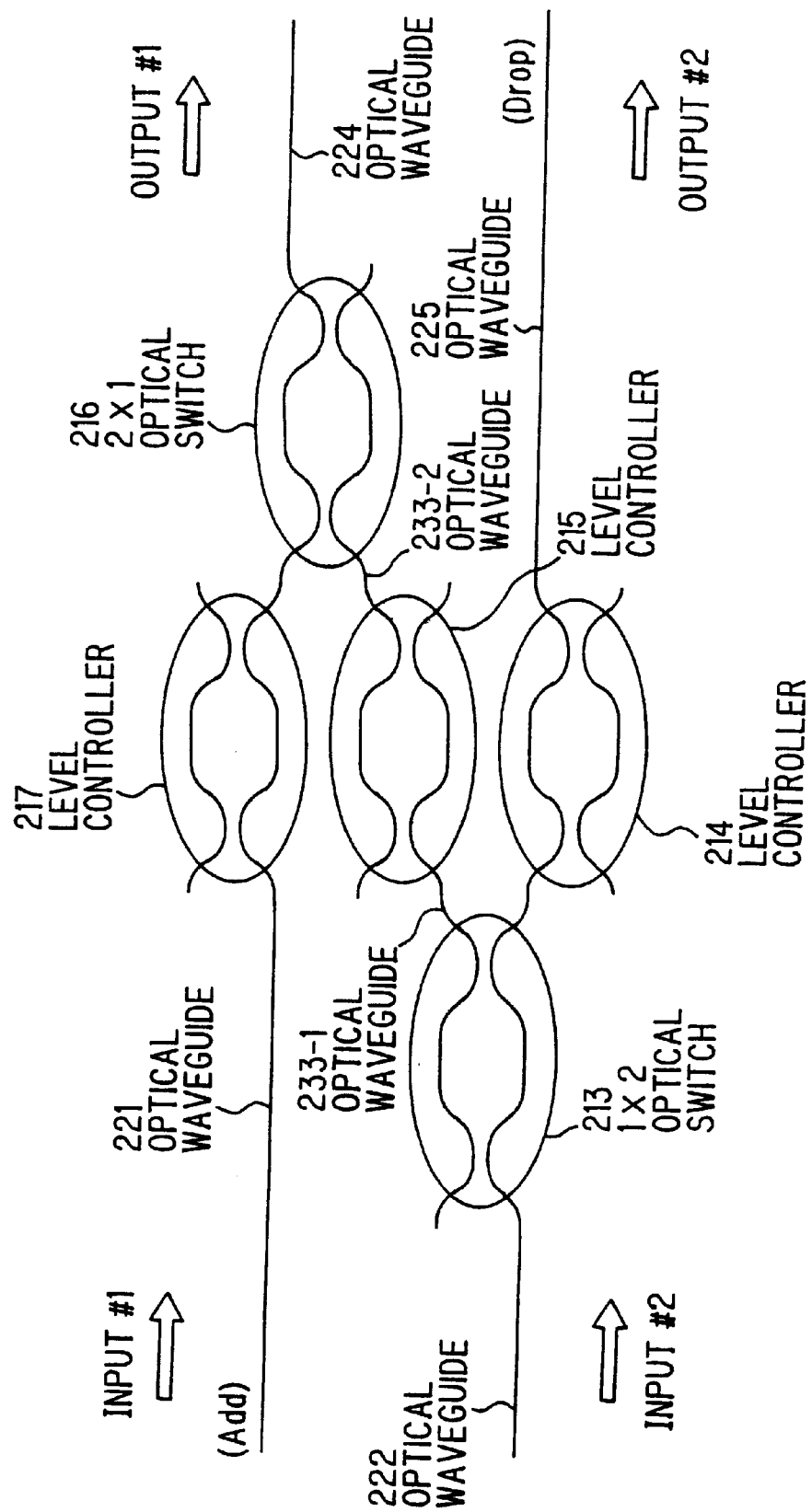
FIG. 13 is a connection diagram showing a variant of the optical circuit section shown in FIG. 9.

FIG. 13 shows a variant of the optical circuit section shown in FIG. 9. According to this preferred embodiment, a directional coupler-type optical switch is used in all the 1×2 optical switch 213, the 2×1 optical switch 216, and the level controllers 214, 215, 217. The level controller 215 is connected to the 1×2 optical switch 213 and the 2×1 optical switch 216 respectively through the optical waveguides 223-1, 223-2.

Figure 14:
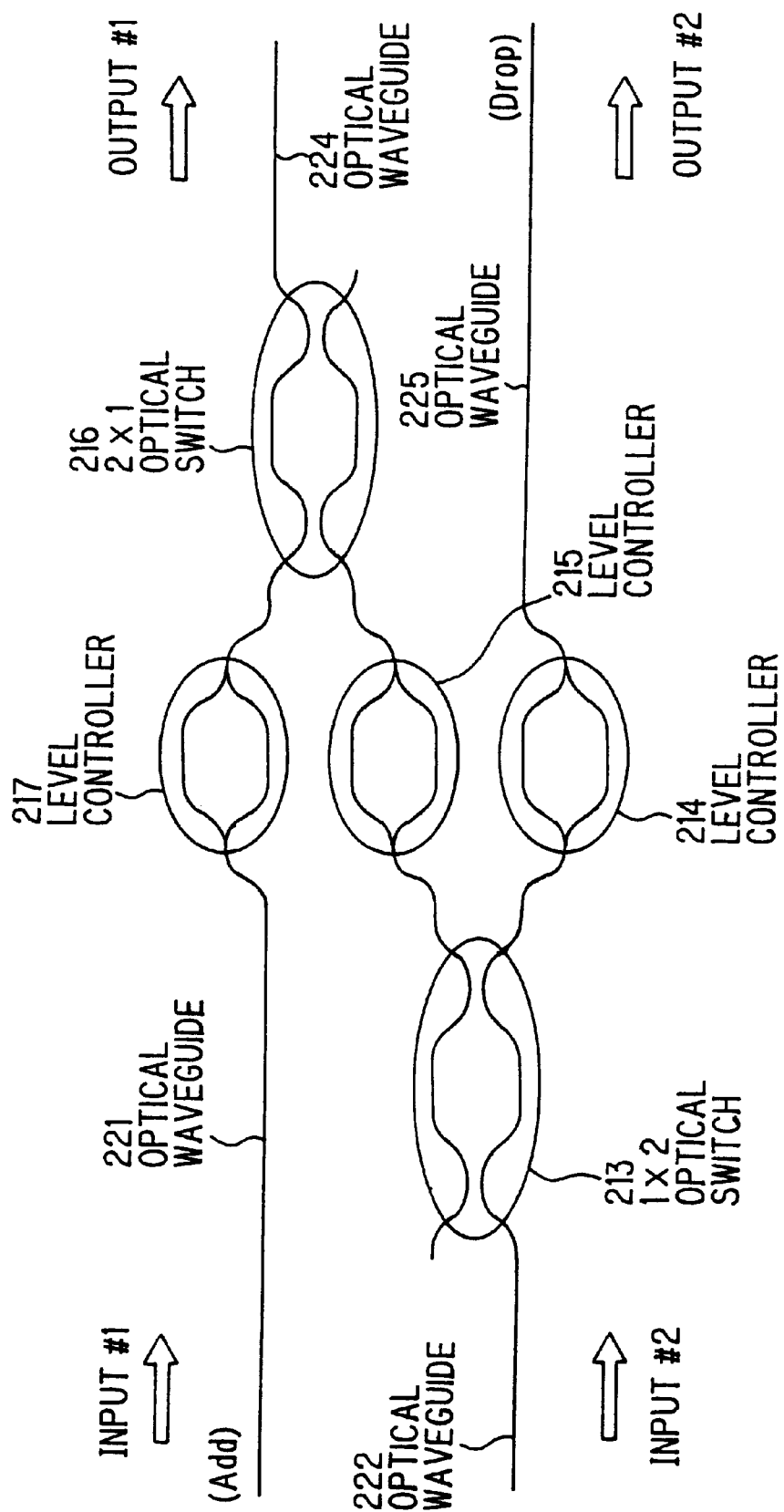
FIG. 14 is a connection diagram showing another variant of the optical circuit section shown in FIG. 9.

FIG. 14 shows another variant of the optical circuit section shown in FIG. 9. According to this preferred embodiment, a directional coupler-type optical switch is used in the 1×2 optical switch 213 and the 2×1 optical switch 216, and an MZ optical switch is used in the level controllers 214, 215, 217. In this construction, as described above, according to the applied voltage, the MZ optical switch may be in an on/off state or may constitute a variable attenuator. Therefore, when the MZ optical switch is used in an on/off state, leak can be prevented. On the other hand, when the MZ optical switch is used as the variable attenuator, the level matching of the paths can be performed.

FIG. 15 shows a construction wherein an electric control system has been added to the optical circuit section shown in FIG. 13. As described above in connection with FIG. 10, the 1×2 optical switch 213 is provided with a signal electrode 213A and ground electrodes 213B, 213C, and a directional coupler is formed in, two places of the optical waveguides. Likewise, the 2×1 optical switch 216 is provided with a signal electrode 216A and ground electrodes 216B, 216C, and a directional coupler is formed in two places of the optical waveguides. The level controller 214 is provided with a signal electrode 214A and ground electrodes 214B, 214C, the level controller 215 is provided with a signal electrode 215A and ground electrodes 215B, 215C, and the level controller 217 is provided with a signal electrode 217A and ground electrodes 217B, 217C. For each of the level controllers, a directional coupler is provided in two places of the optical waveguides.

Further, a wiring pattern 291 is connected to the signal electrode 214A, a wiring pattern 292 to the signal electrode 216A, and a wiring pattern 293 is connected to the signal electrode 217A. The ground electrodes 214B, 214C, 215B, 215C, 217B, 217C are connected to one another through a wiring pattern 294. A direct voltage source 295 is connected between the wiring pattern 291 and the wiring pattern 294, a direct voltage source 296 between the wiring pattern 292 and the wiring pattern 294, and a direct voltage source 297 between the wiring pattern 293 and the wiring pattern 294. The signal electrodes 213A and 216A are connected to each other through a wiring pattern 298, and the ground electrodes 214B, 214C, 216B, 216C are connected to one another through a wiring pattern 299. A direct voltage source 100 is connected to the wiring pattern 298 and the wiring pattern 299.

The direct voltage sources 295 to 297 and 200 may be varied as desired, for example, in the range of 0 to 50 V, and the voltage may be set according to the desired state of operation (on/off state or desired transmittance). The voltages of the level controllers 214, 215, 217 may be set independently of one another respectively by the direct voltage sources 295, 296, 297. The attenuation varies depending upon the voltage values set separately by the direct voltage sources 295 to 297. An identical voltage is applied to the optical switches 213 and 216 by the direct voltage source 200. Therefore, upon the application of a voltage $V_1$ to the optical switches 213, 216, the input #1 communicates with the output #1, while upon the application of a voltage $V_2$ to the optical switches 213, 216, the input #2 communicates with the output #1.

Figure 16A:
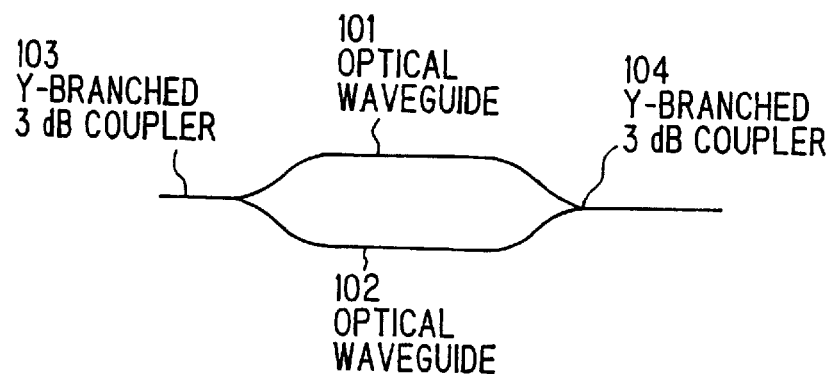
FIGS. 16A, 16B, and 16C are plan views showing preferred embodiment of layout of optical waveguides in an optical switch or a level controller according to the invention.
Figure 16B:
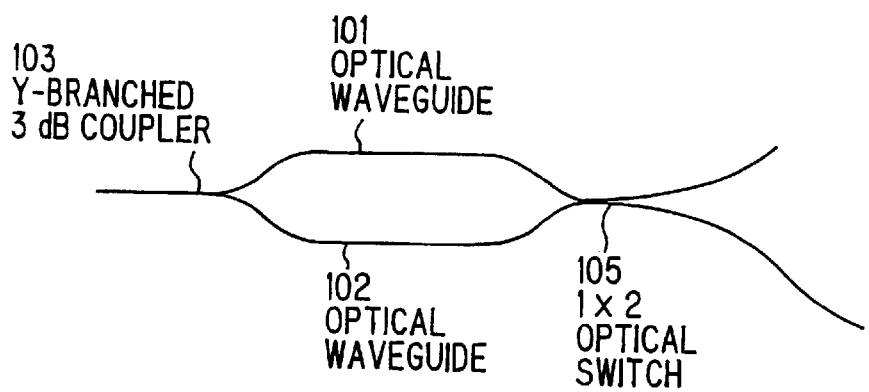
Figure 16C:
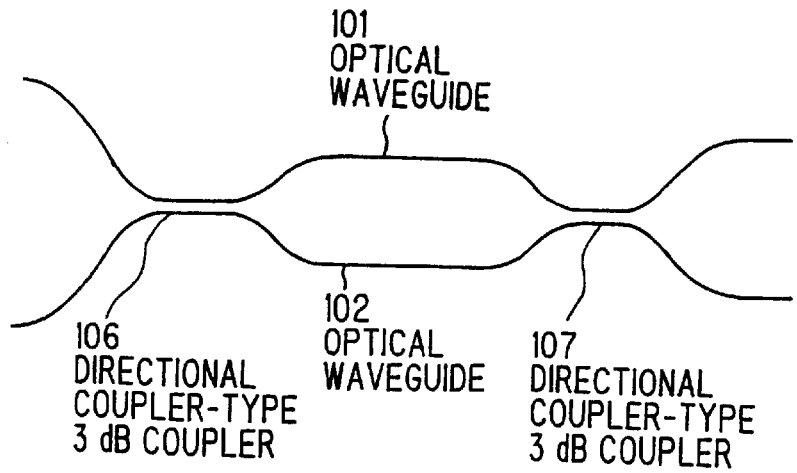

FIGS. 16A to 16C show preferred embodiment of layout of optical waveguides in an optical switch or a level controller according to the invention. FIG. 16A shows a level controller. Y-branched. 3 dB couplers 103, 104 are provided respectively on both sides of the optical waveguides 101, 102 and function as a 1×1 (one input and one output) attenuator. FIG. 16B shows a construction which can be utilized in both an optical switch and a level controller. In this case, a Y-branched 3 dB coupler 103 is used in the input, while a 1×2 optical switch 105 having a non-symmetrical X structure is used in the output.

The construction shown in FIG. 16C also can be utilized in both an optical switch and a level controller. Directional coupler-type 3 dB couplers 106, 107 are provided respectively on both sides of the optical waveguides 101, 102, and function as a 2×2 optical switch.

Figure 17:
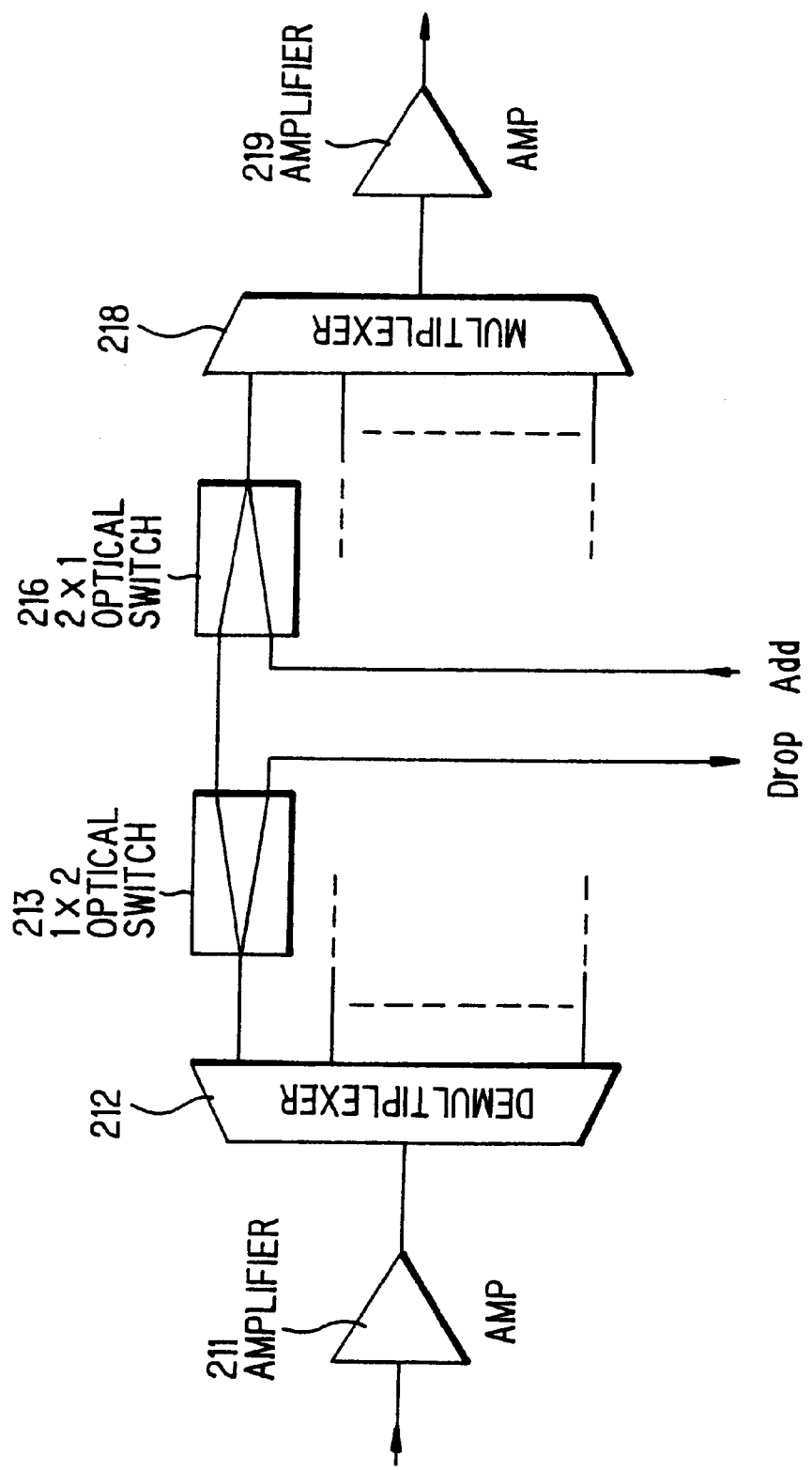
FIG. 17 is a diagram showing the construction of the second preferred embodiment of the optical ADM according to the invention.

FIG. 17 shows a second preferred embodiment of the optical ADM according to the invention. The construction of this preferred embodiment is the same as that shown in FIG. 8, except that the level controllers 214, 215, 217 have been removed. According to this construction, although the level matching of the paths cannot be performed, an optical ADM can be constructed on a single substrate. Because none of the level controllers 214, 215, 217 are provided, the number of components can be reduced, leading to a reduction in size and a reduction in cost of the optical ADM.

Figure 18:
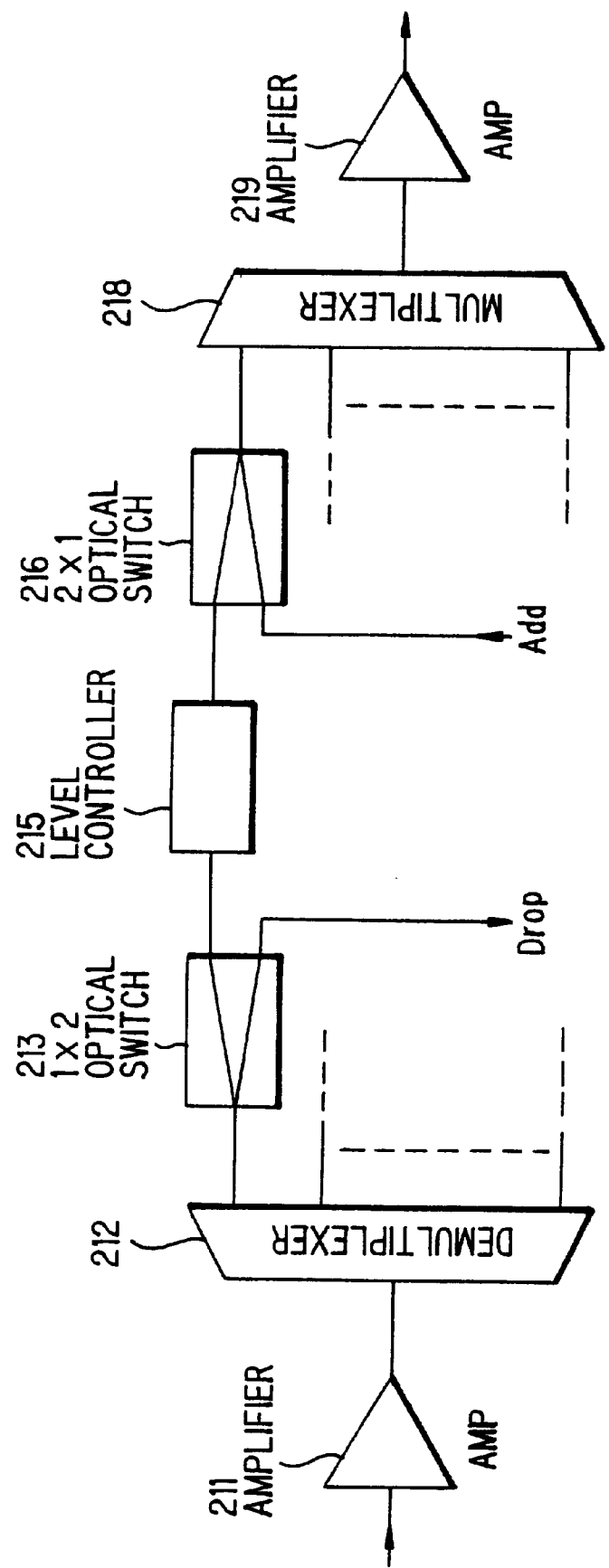
FIG. 18 is a diagram showing the construction of the third preferred embodiment of the optical ADM according to the invention.

FIG. 18 shows a third preferred embodiment of the optical ADM according to the invention. The construction of this preferred embodiment is the same as that shown in FIG. 8, except that the level controllers 214, 217 have been removed. According to this construction, the level matching of the paths for drop and add cannot be performed. For paths between optical switches, however, level regulation can be done by the level controller 215. This construction also can realize a reduction in the number of components which leads to a reduction in size and a reduction in cost of the optical ADM.

Further, a construction may be adopted wherein only the level controller 215 is removed from the construction shown in FIG. 8. Other constructions usable in the invention include one wherein the level controllers 214, 215 are provided while the level controller 217 is removed, and one wherein the level controllers 215, 217 are provided while the level controller 214 is removed.

As described above, according to the optical ADM of the invention, the first and second optical switches for drop and add are provided on a single substrate. This can easily realize a reduction size, an array construction, and a multi-function and, at the same time, can realize a reduction in cost.

Further, according to the optical ADM of the invention, a first level controller is provided between first and second optical switches for drop and add, the level of an optical signal dropped is controlled in a second level controller, and the level of an optical signal added is controlled in a third level controller. The individual members are provided in an integral form on a single substrate. This can realize, for example, a reduction in size, a reduction in weight, a reduction in cost and a multi-function of the optical ADM, and, in addition, can realize the control of the level of optical signals in a path for drop and a path for add.

What is claimed is:

1. An optical matrix switch comprising:
   a branch-selective network in such a form that output ports of m (m=a positive integer) optical switches, each with one input and n (n=a positive integer) outputs, are connected to input ports of n optical switches, each with m inputs and one output, so that the n1st (n1=a positive integer) output port of the m1st (m1=a positive integer) optical switch having one input and n outputs is connected to the m1st input port of the n1st optical switch having m inputs and one output, wherein:
   the optical switches, each having one input and n outputs, and the optical switches, each having m inputs and one output, are formed of a material having electrooptic characteristics such that the refractive index changes upon the application of an electric field; and
   transmittance variable gate members are provided respectively between the output ports of the optical switches, each having one input and n outputs, and the input ports of the optical switches, each having m inputs and one output, wherein a transmittance of each said transmittance variable gate member is controlled from the exterior.

2. The optical matrix switch according to claim 1, wherein the gate member comprises one of a variable optical attenuator having one input and one output and a variable optical amplifier having one input and one output.

3. The optical matrix switch according to claim 2, wherein the optical switch or the variable optical attenuator comprises a Mach-Zehnder interference system.

4. The optical matrix switch according to claim 2, wherein the optical switch or the variable optical attenuator comprises a directional coupler.

5. The optical matrix switch according to claim 2, wherein the variable optical attenuator or the variable optical amplifier comprises a semiconductor optical amplifier gate.

6. The optical matrix switch of claim 1, wherein a regulation of a transmittance of a first gate member and regulation of a transmittance of a second gate member regulates power of light output from a first output and a second output, respectively.

7. The optical matrix switch of claim 1, wherein a regulation of a transmittance of a predetermined gate member controls the power output from each channel.

8. An optical matrix switch comprising:
   a branch-selective network in such a form that output ports of m (m=a positive integer) optical switches, each having one input and n (n=a positive integer) outputs, are connected to input ports of n optical switches, each having m inputs and one output, so that the n1st (n1=a positive integer) output port of the m1st (m1=a positive integer) optical switch having one input and n outputs is connected to the mist input port of the n1st optical switch having m inputs and one output, wherein:
   the optical switches, each having one input and n outputs, and the optical switches, each having m inputs and one output, are formed of a material having electrooptic characteristics such that the refractive index changes upon the application of an electric field,
   transmittance variable gate members are provided respectively between the output ports of the optical switches, each having one input and n outputs, and the input ports of the optical switches, each having m inputs and one output,
   the gate member comprises one of a variable optical attenuator having one input and one output and a variable optical amplifier having one input and one output, and
   the optical switch or the variable optical attenuator comprises a digital optical switch which has a function such that a waveguide, from which an optical output is actually provided, is selected from a plurality of output optical waveguides by varying, through a change in electric field, the refractive index of the plurality of output optical waveguides connected in a Y-branched form to one input optical waveguide.

9. An optical matrix switch comprising:
   a branch-selective network in such a form that output ports of m (m=a positive integer) optical switches, each having one input and n (n=a positive integer) outputs, are connected to input ports of n optical switches, each having m inputs and one output, so that the n1st (n1=a positive integer) output port of the mist (m1=a positive integer) optical switch with one input and n outputs is connected to the m1st input port of the n1st optical switch having m inputs and one output, wherein:
   the optical switches, each having one input and n outputs, and the optical switches, each having m inputs and one output, are formed of a material having electrooptic characteristics such that the refractive index changes upon the application of an electric field,
   transmittance variable gate members are provided respectively between the output ports of the optical switches, each having one input and n outputs, and the input ports of the optical switches, each having m inputs and one output,
   the gate member comprises one of a variable optical attenuator having one input and one output and a variable optical amplifier having one input and one output, and
   the optical matrix switch comprises an optical waveguide formed within a crystal material having an electrooptic effect and a switching of the optical path or a regulation of the transmittance is performed by a voltage applied to the optical waveguide.

10. An optical matrix switch comprising:
   a branch-selective network in such a form that output ports of m (m=a positive integer) optical switches, each with one input and n (n=a positive integer) outputs, are connected to input ports of n optical switches, each with m inputs and one output, so that the n1st (n1=a positive integer) output port of the m1st (m1=a positive integer) optical switch having one input and n outputs is connected to the m1st input port of the n1st optical switch having m inputs and one output, wherein:
   the optical switches, each having one input and n outputs, and the optical switches, each having m inputs and one output, are formed of a material having electrooptic characteristics such that the refractive index changes upon the application of an electric field, transmittance variable gate members are provided respectively between the output ports of the optical switches, each having one input and n outputs, and the input ports of the optical switches, each having m inputs and one output, the gate member comprises one of a variable optical attenuator having one input and one output and a variable optical amplifier having one input and one output, the optical switch or the variable optical attenuator comprises a Mach-Zehnder interference system, and the optical matrix switch comprises an optical waveguide formed within a crystal material having an electrooptic effect and a switching of the optical path or a regulation of the transmittance is performed by a voltage applied to the optical waveguide.

11. An optical matrix switch comprising:

a branch-selective network in such a form that output ports of m (m=a positive integer) optical switches each having one input and n (n=a positive integer) outputs are connected to input ports of n optical switches each having m inputs and one output so that the n1st (n1=a positive integer) output port of the m1st (m1=a positive integer) optical switch having one input and n outputs is connected to the m1st input port of the n1st optical switch having m inputs and one output, wherein:

the optical switches, each having one input and n outputs, and the optical switches, each having m inputs and one output, are formed of a material having electrooptic characteristics such that the refractive index changes upon the application of an electric field, transmittance variable gate members are provided respectively between the output ports of the optical switches, each having one input and n outputs, and the input ports of the optical switches, each having m inputs and one output, the gate member comprises one of a variable optical attenuator and a variable optical amplifier with one input and one output, the optical switch or variable optical attenuator comprises a directional coupler, and the optical matrix switch comprises an optical waveguide formed within a crystal material having an electrooptic effect, and a switching of the optical path or a regulation of the transmittance is performed by a voltage applied to the optical waveguide.

12. An optical ADM (add-drop multiplexer) comprising:

a substrate;

a first optical switch which is provided on the substrate and outputs an optical signal, which has been input through a first input port, to one of a first output port (a terminal for drop) and a terminal for through; and a second optical switch which is provided on the substrate and outputs, to a second output port, one of the optical signal output from the terminal for through of the first optical switch and an optical signal from a second input port (a terminal for add), wherein the second optical switch is connected to the terminal for through in the first optical, switch through a level controller that controls the level of the optical signal from the first optical switch.

13. An optical ADM (add-drop multiplexer) comprising:

a substrate, a first optical switch which is provided on the substrate and outputs an optical signal, which has been input through a first input port, to one of a first output port (a terminal for drop) and a terminal for through; and a second optical switch which is provided on the substrate and outputs, to a second output port, one of the optical signal output from the terminal for through of the first optical switch and an optical signal from a second input port (a terminal for add), wherein the second optical switch is connected to the terminal for through in the first optical switch through a level controller that controls the level of the optical signal from the first optical switch, and the level controller changes a transmittance according to one of an applied voltage and a feed current, and an output level of the input optical signal from the second optical switch is controlled according to the transmittance.

14. The optical ADM according to claim 12, wherein each of the optical switches and the level controller comprise one of a Mach-Zehnder optical switch, a variable optical amplifier, a variable optical attenuator, and a directional coupler optical switch.

15. The optical ADM according to claim 14, wherein the variable optical attenuator or the variable optical amplifier comprises a semiconductor optical amplifier gate.

16. An optical ADM (add-drop multiplexer) comprising:

a substrate;

a first optical switch which is provided on the substrate and outputs an optical signal, which has been input through a first input port, to one of a first output port (a terminal for drop) and a terminal for through; and a second optical switch which is provided on the substrate and outputs, to a second output port, one of the optical signal output from the terminal for through of the first optical switch and an optical signal from a second input port (a terminal for add), wherein the second optical switch is connected to the terminal for through of the first optical switch through a level controller that controls the level of the optical signal from the first optical switch, and each of the optical switches and the level controller comprise one of a Mach-Zehnder Zehnder optical switch, a variable optical amplifier, a variable optical attenuator, and a directional coupler optical switch.

17. An optical ADM (add-drop multiplexer) comprising:

a substrate;

a first optical switch which is provided on the substrate and outputs an optical signal, which has been input through a first input port, to one of a first output port (a terminal for drop) and a terminal for through; and a second optical switch which is provided on the substrate and outputs, to a second output port, one of the optical signal output from the terminal for through of the first optical switch and an optical signal from a second input port (a terminal for add), wherein the second optical switch is connected to the terminal for through of the first optical switch through a level controller that controls the level of the optical signal from the first optical switch, each of the optical switches and the level controller comprises one of a Mach-Zehnder optical switch, a variable optical amplifier, a variable optical attenuator, and a directional coupler optical switch, and the variable optical attenuator or the variable optical amplifier comprises a semiconductor optical amplifier gate.

18. An optical ADM (add-drop multiplexer) comprising:
a substrate;
a first optical switch which is provided on the substrate and outputs an optical signal, which has been input through a first input port, to one of a first output port (a terminal for drop) and a terminal for through;
a second optical switch which is provided on the substrate and outputs, to a second output port, one of the optical signal output from the terminal for through of the first optical switch and an optical signal from a second input port (a terminal for add);
a first level controller which is provided on the substrate and controls a level of an optical signal directed from the first optical switch to the second optical switch;
a second level controller which is provided on the substrate and controls a level of an optical signal output to the terminal for drop; and
a third level controller which is provided on the substrate and controls a level of an optical signal input into the second optical switch through the terminal for add.

19. The optical ADM according to claim 18, wherein at least one of the first and second optical switches changes a refractive index in response to the application of one of an electric field and a temperature change, and an output path is switched according to the refractive index.

20. The optical ADM according to claim 18, wherein the first to third level controllers change a transmittance according to one of an applied voltage and a feed current, and an output level of an input optical signal is controlled according to the transmittance.

21. The optical ADM according to claim 19, wherein each of the optical switches or each of the level controllers comprises one of a Mach-Zehnder optical switch, a variable optical amplifier, a variable optical attenuator, and a directional coupler optical switch.

22. The optical ADM according to claim 20, wherein each of the optical switches or each of the level controllers comprises one of a Mach-Zehnder optical switch, a variable optical amplifier, a variable optical attenuator, and a directional coupler optical switch.

23. The optical ADM according to claim 21, wherein the variable optical amplifier and the variable optical attenuator each comprise a semiconductor optical amplifier gate.

24. The optical ADM according to claim 22, wherein the variable optical amplifier and the variable optical attenuator each comprise a semiconductor optical amplifier gate.

* * * * *